(12) United States Patent
Quinn et al.

(10) Patent No.: US 10,830,272 B2
(45) Date of Patent: Nov. 10, 2020

(54) RATCHET FASTENING NUT

(71) Applicant: Hampton Products International Corporation, Foothill Ranch, CA (US)

(72) Inventors: Jason L. Quinn, Spooner, WI (US); Lucas J. Stanton, Stone Lake, WI (US)

(73) Assignee: Hampton Products International Corporation, Foothill Ranch, CA (US)

( * ) Notice: Subject to any disclaimer, the term of this patent is extended or adjusted under 35 U.S.C. 154(b) by 317 days.

(21) Appl. No.: 16/128,366

(22) Filed: Sep. 11, 2018

(65) Prior Publication Data

US 2019/0078607 A1    Mar. 14, 2019

Related U.S. Application Data

(60) Provisional application No. 62/556,938, filed on Sep. 11, 2017.

(51) Int. Cl.
  *F16B 39/32* (2006.01)
  *F16B 37/08* (2006.01)
  *F16B 21/18* (2006.01)

(52) U.S. Cl.
  CPC ............ *F16B 39/32* (2013.01); *F16B 21/186* (2013.01); *F16B 37/0857* (2013.01)

(58) Field of Classification Search
  CPC .... F16B 21/186; F16B 31/04; F16B 37/0821; F16B 37/0835; F16B 37/0857; F16B 37/0864; F16B 37/0885; F16B 37/14; F16B 39/32; F16B 41/005; Y10S 411/91; Y10S 411/917

USPC .............. 411/372.5, 429, 432, 433
See application file for complete search history.

(56) References Cited

U.S. PATENT DOCUMENTS

| | | | | |
|---|---|---|---|---|
| 1,705,811 | A * | 3/1929 | Eidel, Jr. ............. | F16B 37/0821 411/437 |
| 6,712,574 | B1 * | 3/2004 | Roopnarine ........ | F16B 37/0857 411/267 |
| 8,061,945 | B2 * | 11/2011 | Smith ................. | F16B 37/0857 411/267 |
| 8,646,339 | B2 * | 2/2014 | Smith ..................... | B25B 23/14 73/862.338 |
| 8,708,629 | B2 * | 4/2014 | Smith ..................... | F16B 39/32 411/267 |
| 2005/0008448 | A1 * | 1/2005 | Doubler ............... | F16B 21/186 411/353 |

(Continued)

*Primary Examiner* — Roberta S Delisle
(74) *Attorney, Agent, or Firm* — Klein, O'Neill & Singh, LLP

(57) ABSTRACT

A clamp-action ratchet fastening nut assembly comprising, a body having a proximal end and a distal end, a hollow cap connected to the body, an annular collar within the cap and defining an interior camming surface, a plurality of threaded axial nut sections disposed in the hollow cap in engagement with the annular collar, and configured for movement between a radially closed position in which the plurality of threaded axial nut sections form an axial bore having a continuous internal thread, and a radially open position, and a spring positioned in the hollow cap and configured to bias the plurality of threaded axial nut sections proximally against the interior camming surface of the annular collar, whereby the plurality of threaded axial nut sections is urged from the radially open position to the radially closed position.

18 Claims, 16 Drawing Sheets

(56) References Cited

U.S. PATENT DOCUMENTS

| | | | | |
|---|---|---|---|---|
| 2007/0286702 A1* | 12/2007 | Smith | ............... | F16B 37/0857 411/432 |
| 2008/0179883 A1* | 7/2008 | Fullerton | ............ | F16B 37/0857 285/330 |
| 2009/0324364 A1* | 12/2009 | Smith | ............... | F16B 37/0857 411/433 |
| 2010/0129178 A1* | 5/2010 | Smith | ............... | F16B 37/0842 411/436 |
| 2012/0134764 A1* | 5/2012 | Smith | .................... | F16B 39/32 411/267 |
| 2015/0198197 A1* | 7/2015 | Taneichi | ............ | F16B 37/0807 411/433 |

\* cited by examiner

RATCHET FASTENING NUT

CROSS-REFERENCE TO RELATED APPLICATIONS

This application claims the benefit, under 35 U.S.C. § 119(e), of U.S. Provisional Application No. 62/556,938, filed Sep. 11, 2017, the disclosure of which is incorporated herein in its entirety.

FEDERAL SPONSORED RESEARCH OR DEVELOPMENT

Not applicable.

FIELD OF THE ART

The present disclosure pertains to fasteners, nuts, and related methods, and more particularly to a fastening nut.

BACKGROUND

Fasteners are used in many aspects of modern life. Bolts and nuts are used in a variety of industries to provide means of coupling components together. Generally, a bolt having threading can be placed through components that are desired to be coupled, and a nut with corresponding threading is then rotatably screwed onto the bolt. The bolt and/or nut is then rotated upon until fully seated and the components are secured.

Screwing a long, threaded bolt through a threaded nut can require many rotations of the nut and/or bolt, and thus can take a long time. The present disclosure provides a threaded nut that allows the threaded bolt to be pressed or inserted through the nut, without the need for the threaded bolt to be rotated or "threaded" into the nut. Accordingly, only a final tightening with a partial rotation of the bolt is required. This feature or characteristic would thus save a great deal of time compared to a conventional nut-and-bolt assembly.

SUMMARY

Broadly, this disclosure relates to an internally-threaded fastening nut assembly for an elongated threaded fastener (e.g., a bolt) having a head at the proximal end of an externally-threaded body, wherein the nut assembly is configured to allow a substantial length of the fastener body to be inserted axially through the nut assembly before the fastener is tightened by rotational movement with the internal and external threads engaged.

More specifically, in an aspect, the nut assembly comprises a tubular body having a plurality of internally-threaded, axially-divided nut sections configured as clamping jaws at a proximal end. The axial nut sections, defining an axial bore, are movable between an open position that allows the fastener body to be inserted axially, and a closed position. The nut sections have correlated threads, meaning that, when in the closed position, the nut sections form a continuous internal thread in the bore that engages the external threads of the fastener body.

In one aspect, a circumferential groove may be provided around the nut sections to accommodate a retention ring that maintains the axial nut sections in the proper axial alignment for correlating their respective threads. Alternatively, the need for the retention ring is obviated by configuration of the nut sections so as to permit relative axial travel of not more than one pitch distance.

When the fastener body is inserted through the nut sections in their open position, it pushes the nut sections distally against the force of a biasing spring. As the fastener body advances, the nut sections are urged toward their closed position under the force of the biasing spring, thereby forming an internally-threaded bore that allows the fastener to be tightened with the nut assembly by rotational movement. While the clamping jaws provide a ratcheting effect upon insertion of the fastener, the fastener may also be loosened or backed out of the threaded bore, as with a conventional nut.

BRIEF DESCRIPTION OF THE DRAWINGS

FIG. 6A shows the fastening nut assembly with the nut sections in a first position. FIG. 6B shows the nut sections in a second position.

FIG. 12A shows the nut sections in a second, or open, position. FIG. 12B shows the nut sections in a first, or closed, position.

DETAILED DESCRIPTION

The detailed description set forth below in connection with the appended drawings is intended as a description of the present embodiments of ratchet fastening nuts provided in accordance with aspects of the present components, assemblies, and method and is not intended to represent the only forms in which the present components, assemblies, and method may be constructed or utilized. The description sets forth the features and the steps for constructing and using the embodiments of the present components, assemblies, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

The present disclosure relates to a ratchet fastening nut or clamp-action fastening nut assembly that comprises a plurality of axial nut sections, each nut section having a portion of threads. When a fastener (e.g., a bolt or screw) is inserted into the fastening nut assembly, the fastener can push the nut sections backwards and radially outwardly against a spring from a first or closed position towards a second, open position. The spring is biased and configured for returning the nut sections to the closed position. In this way, the inner circumference formed by the threads of the nut sections increases to allow the fastener to be inserted into the fastening nut assembly by axial movement only. The threaded nut sections are biased radially outward relative to the fastener to the second position, such that the fastener is insertable into the bore without rotation relative to the body. In the closed position, the threads of the threaded nut sections are positioned to engage an external thread of the fastener.

Figure 1:
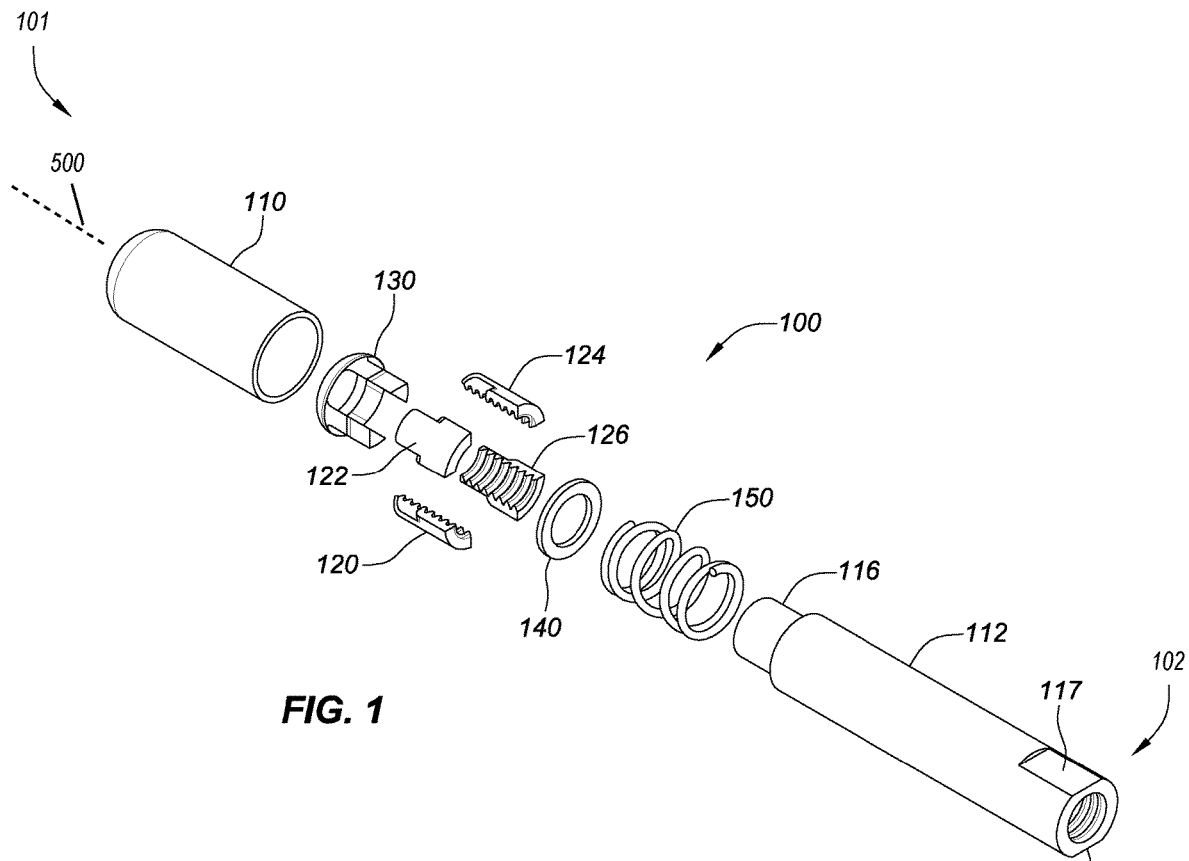
FIG. 1 is an exploded view of a clamp-action fastening nut or ratchet fastening nut in accordance with an aspect of this disclosure, taken from the front and side of the fastening nut assembly.

FIG. 1 illustrates an exploded perspective view of a clamp-action fastening nut assembly 100 in accordance with embodiments of this disclosure. The assembly 100, which may be defined as having a proximal end 101 and distal end 102 (shown in FIG. 2), includes a main body 112, the proximal portion of which is enclosed by a cap 110. As will be described in more detail below, the assembly 100 may have a collar 130, axial nut sections 120, 122, 124, 126, a washer 140, and a return spring 150 at least partially sleeved over a reduced-diameter race 116 at the proximal end of the main body 112. The assembly 100 provides a fastener capture and locking ability through the nut sections 120, 122, 124, 126. The nut sections 120, 122, 124, 126, the collar 130, and the main body 112 define a central axial bore having a bore axis 500. The main body 112 can have a through hole bore along the bore axis 500, and may include a flat 117 at a distal end configured to provide one or more surfaces for engagement with a wrench or to be received in a correspondingly shaped receptacle in another component to prevent rotation. Additionally, the distal end of the main body 112 can be provided with internal threading 112t for attachment of the assembly 100 to other devices or components. In this way, the assembly 100 can act as a standoff for mounting other devices components.

In one example, the assembly 100 may serve as an install post for a door lockset (not shown). The distal end of the main body 112, with flats or cutouts 117, may be inserted into a corresponding hole of a spring cage mount of the lockset to prevent rotation, while a threaded fastener from a back side of the spring cage mount engages the internal threading 112t to fix the assembly 100 to the spring cage mount.

Figure 2:
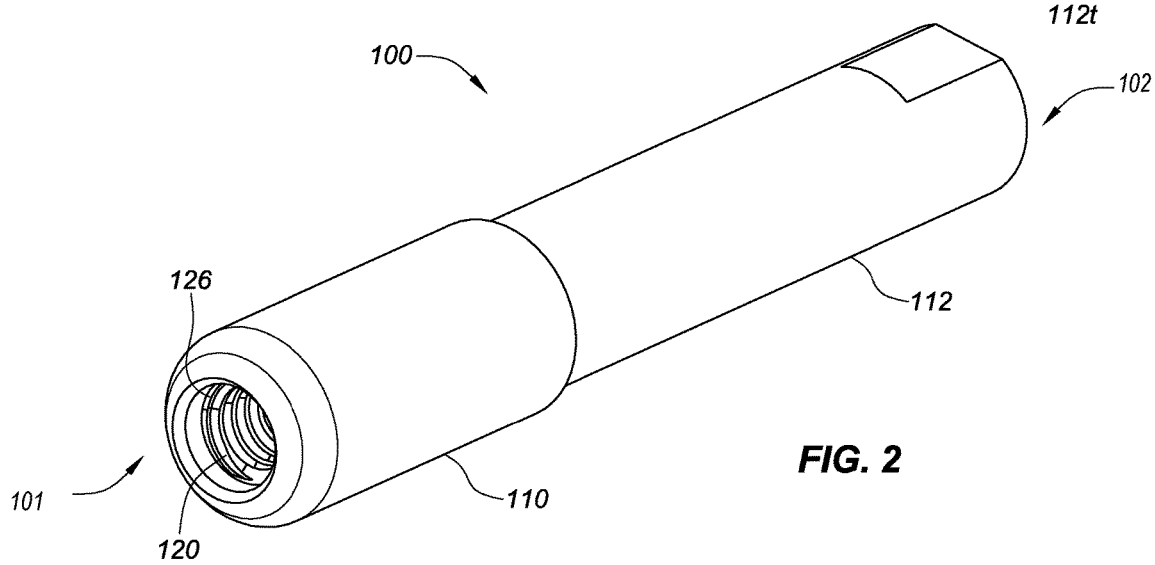
FIG. 2 is a perspective view of a clamp-action fastening nut in accordance with an aspect of this disclosure, taken from the rear and side of the fastening nut assembly.

As shown in FIG. 2, the cap 110 covers a proximal portion of the main body 112, and it may extend distally along the greater part of the length of the main body 112. In some aspects, the cap 110 and the main body 112 might be the only visible components of the assembly 100. One or both of the cap 110 and the main body 112 may be configured to enclose the internal components of the assembly 100, including the collar 130, the nut sections 120, 122, 124, 126, the washer 140, and the return spring 150.

Figure 3:
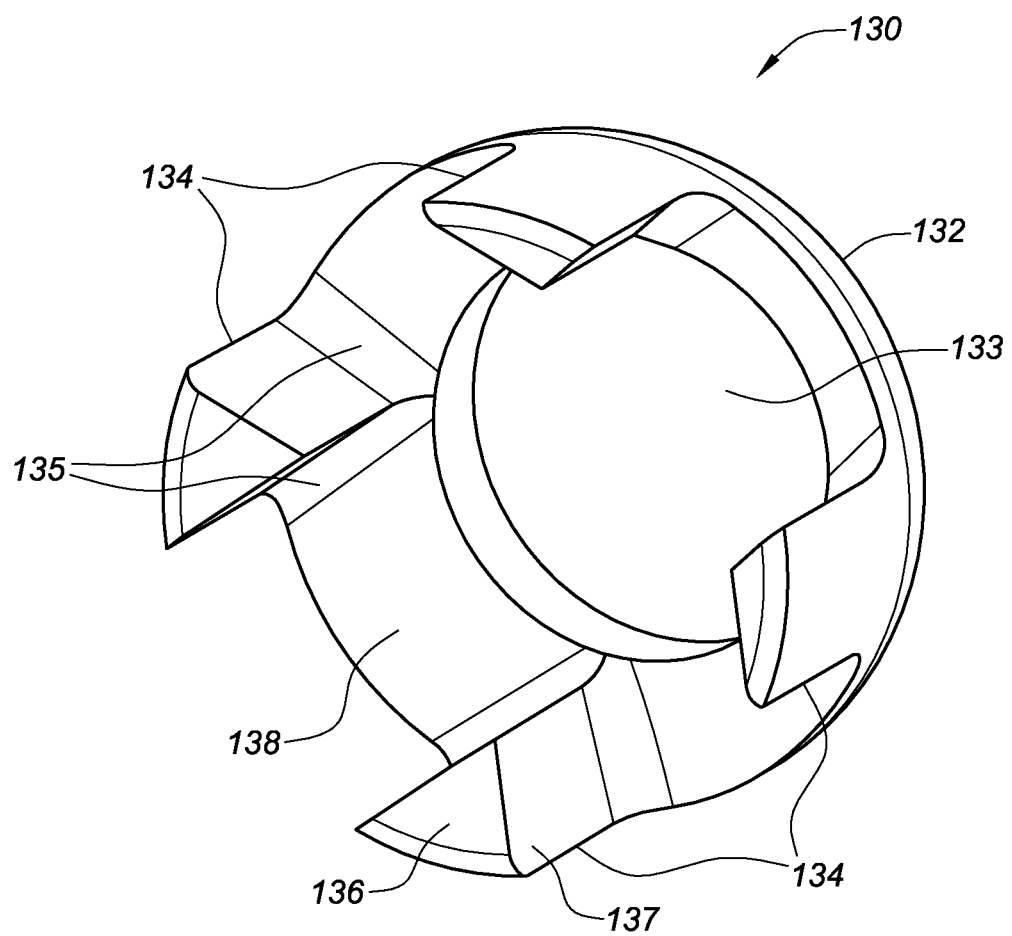
FIG. 3 is a perspective view of the collar having ribs and a tapered surface for use in a fastening nut assembly in accordance with an aspect of the present disclosure.

FIG. 3 illustrates a perspective view of the collar 130. The collar 130 includes an annular portion 132 with a central opening 133 sized to receive a fastener that is accommodated by the ratchet fastening nut assembly 100. A plurality of ribs 134 (e.g., four, in the illustrated example) may project from one side of the annular portion 132. The ribs 134 may be equidistantly spaced around the outer periphery of the annular portion 132. The ribs 134, with side surfaces 137, may be contoured to conform generally to the periphery of the annular portion 132. Each of the ribs 134 may also have a fillet 135 where the rib 134 meets the annular portion 132. Each of the ribs 134 has a proximal portion that may be formed with a tapered surface 136 that may be angled towards the annular portion 132 when closer to an axial center of the collar 130. A collar opening 138, defined between pairs of the ribs 134, is configured to accept the nut sections described below. Additionally, in some embodiments, the collar 130 may be integrally formed with the cap 110, in which case the ribs 134 may extend from an interior surface of the cap 110.

Figure 4:
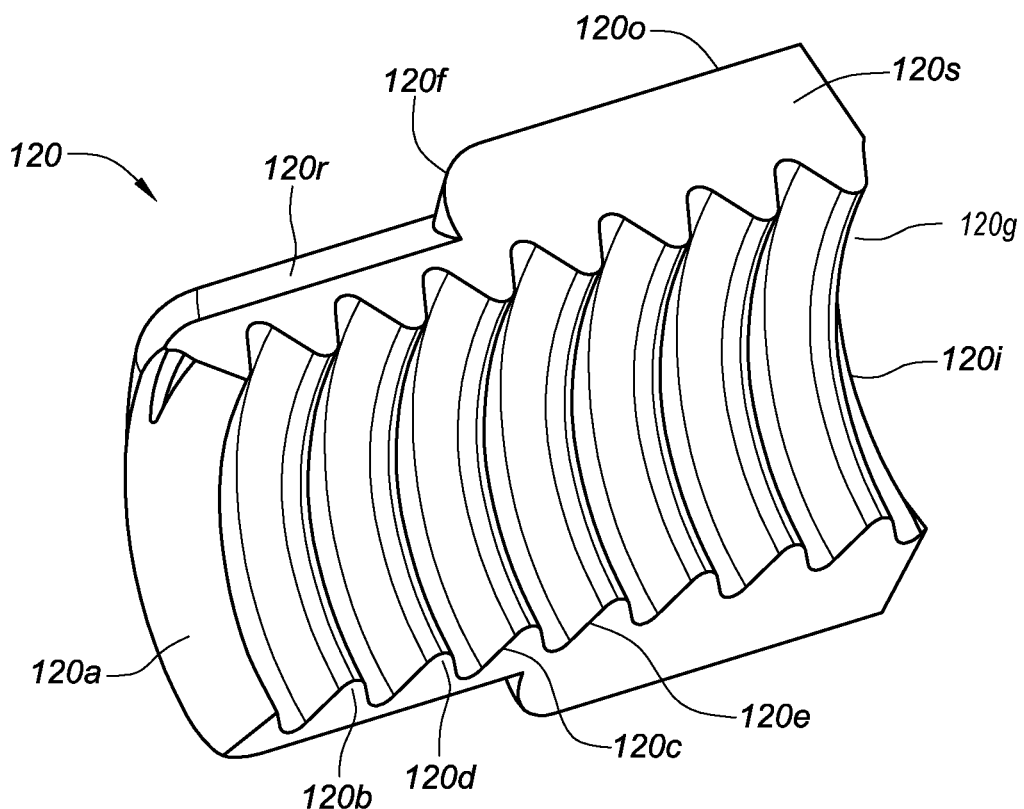
FIG. 4 is a perspective view of a representative nut section for use in a fastening nut assembly in accordance with an aspect of the present disclosure.

Although the illustrated exemplary embodiment includes four axial nut sections 120, 122, 124, 126, it is understood that other embodiments may have more or fewer than four sections, e.g., three sections, five sections, possibly more than five. Conceivably, embodiments may include only two such sections. FIG. 4 illustrates an exemplary nut section 120, as may be included in a four-section embodiment. All the nut sections 120, 122, 124, 126 may have generally similar physical characteristics, with the exception of the threading pattern. The exemplary nut section 120 may be understood as generally corresponding to an arcuate portion of corresponding threading to mate with a threaded fastener.

For the sake of brevity, the following discussion is provided with reference to the nut section 120, but it is applicable to the other nut sections 122, 124, and 126. The nut section 120 has an interior 120i having a front or proximal face 120a, a back or distal face 120g, and side edges 120s extending between the proximal and distal ends of the nut section 120. The front face 120a may be sloped and configured to engage with the corresponding fastener. A guide surface 120r, extending distally from the front face 120a, may be provided to inhibit or prevent rotation. The interior 120i has an arcuate portion generally defining a minor diameter 120b for interfacing with the corresponding fastener. The threading of the nut section 120 may be understood as having a thread flank 120c and a thread crest 120d. A next thread flank 120e is defined for illustrative purposes below, and it can be understood as the flank of a following thread groove after the thread flank 120c. On the exterior side 120o, there may be provided a shoulder 120f, which may be configured with a radius or fillet. As noted above, each of the other nut sections 122, 124, 126 has the above described features illustrated by the nut section 120.

Figure 5:
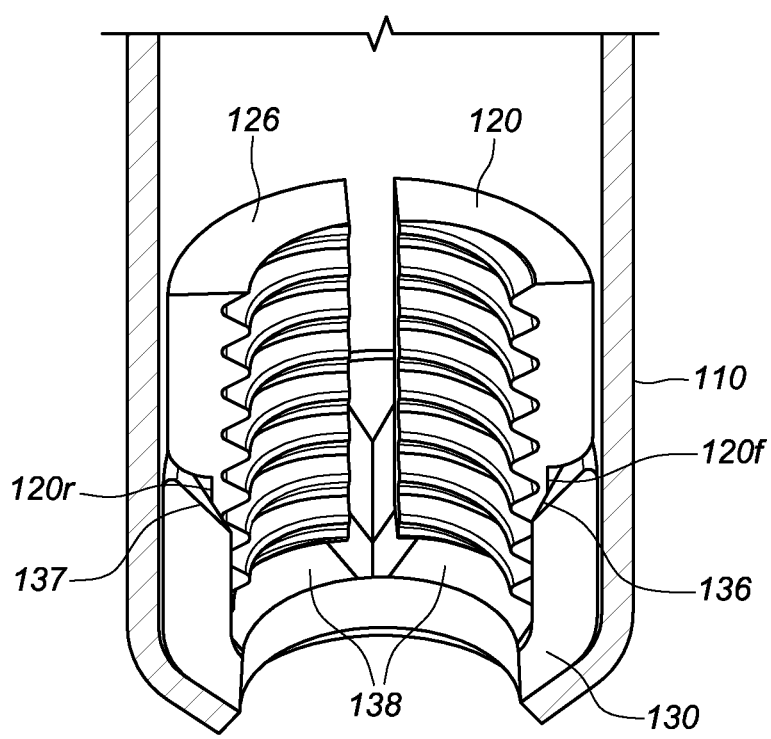
FIG. 5 is a perspective view, taken from the rear and partially in cross-section, of the interface between several nut sections, a collar, and a cap in accordance with an aspect of the present disclosure.
Figure 6A:
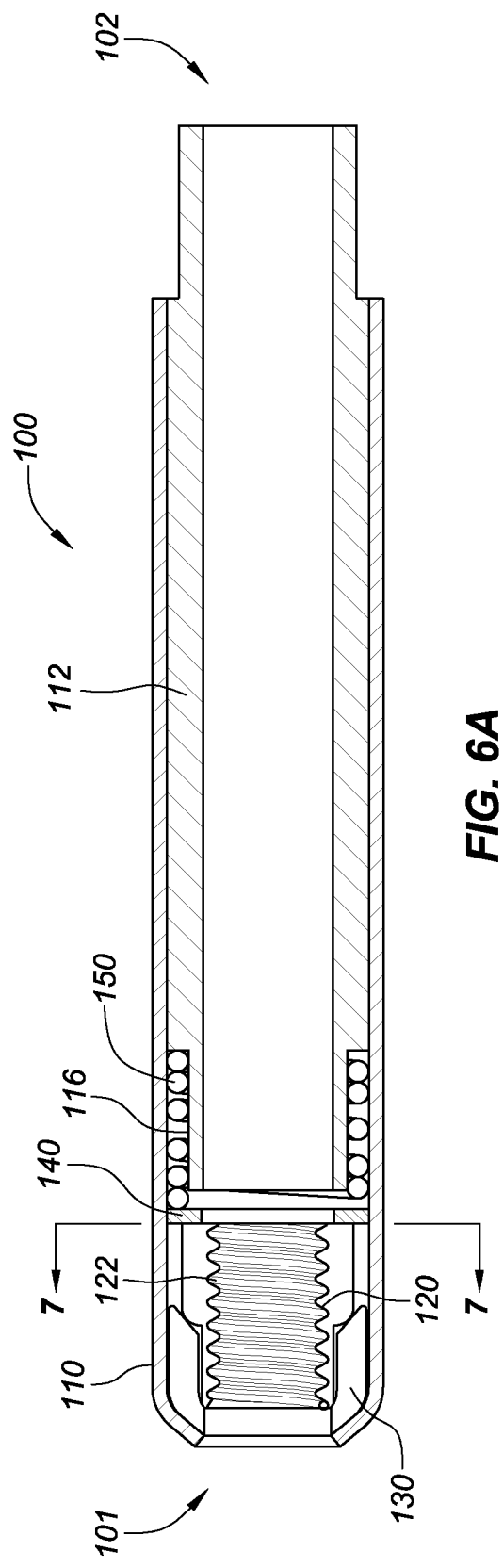
FIGS. 6A and 6B are plan views, taken in cross-section, of a fastening nut assembly in accordance with an aspect of the present disclosure.
Figure 6B:
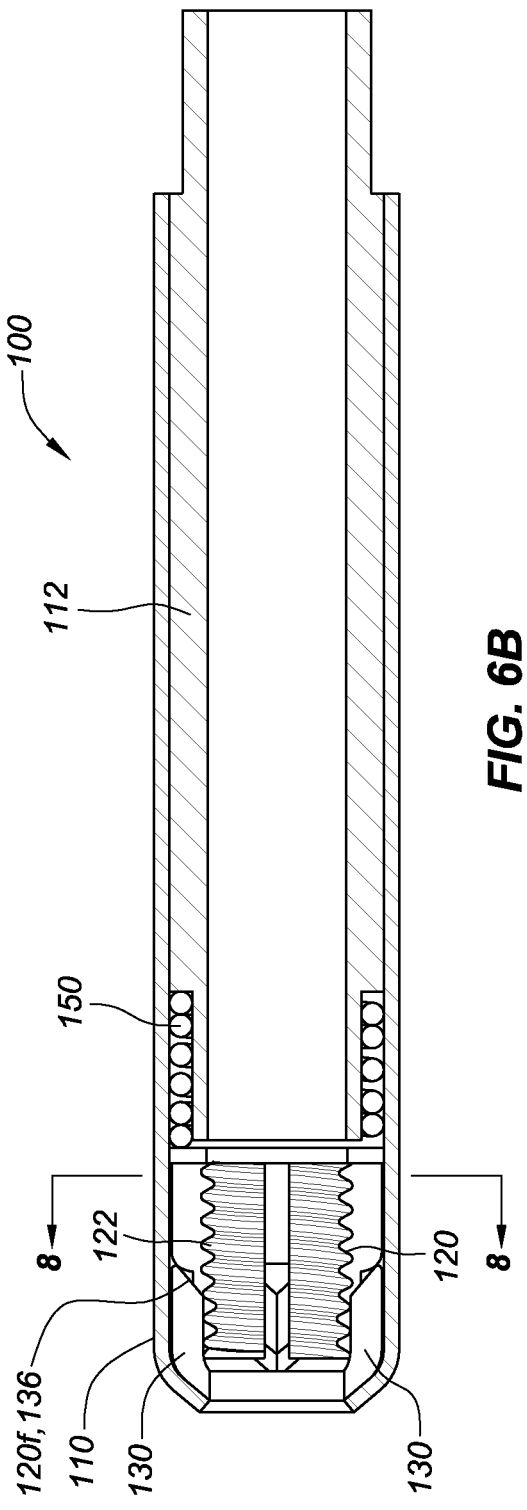

FIGS. 5, 6A, and 6B illustrate an exemplary embodiment of the relationship between the nut sections 120, 122, 124, 126 and the collar 130 when assembled in the interior of the cap 110. An exemplary explanation is provided with reference to the nut section 120, but it can be understood as applying to the other nut sections also. In an assembled position, the proximal portions of the nut sections are received in the opening 138 of the collar 130. Using one nut section 120 to illustrate the arrangement common to all the nut sections, the shoulder 120f of the nut section 120 is in contact with the tapered surface 136 of the collar 130, while the guide surface 120r of the nut section 120 is in contact with or close to the side surface 137 of the collar 130. The washer 140 abuts the back face 120g of the nut section 120 and is engaged by the return spring 150 to bias the washer 140 and thereby the nut sections 120, 122, 124, 126 in a proximal direction. As mentioned above, the return spring 150 may be installed on an outer race 116 of the main body 112. The outer race 116 can be a circumferentially inset or reduced-diameter region of the main body 112, and it may be configured such that a major portion of the return spring 150 is arranged concentrically over the outer race 116, with a portion of the return spring 150 extending beyond the main body 112 and contacting the washer 140. Thus, the washer 140 serves as an intermediate element between the nut sections and the return spring 150 to ensure pressure is applied to the nut sections simultaneously. In some embodiments, the washer 140 may be omitted, in which case, the return spring 15 directly contacts and exerts a proximate force to the nut sections.

Each of the nut sections 120, 122, 124, 126 can be internally threaded so as to form a continuous thread when the nut sections are moved radially inward toward each other in a closed or engagement position, as described below, whereby the continuous internal thread so formed corresponds to a conventional interior thread formed by thread-tapping means. In methods of forming the internal threads of the nut sections, it can be envisioned that the nut sections may be threaded in a single operation where the nut sections are held together to ensure formation of a continuous thread.

Figure 7:
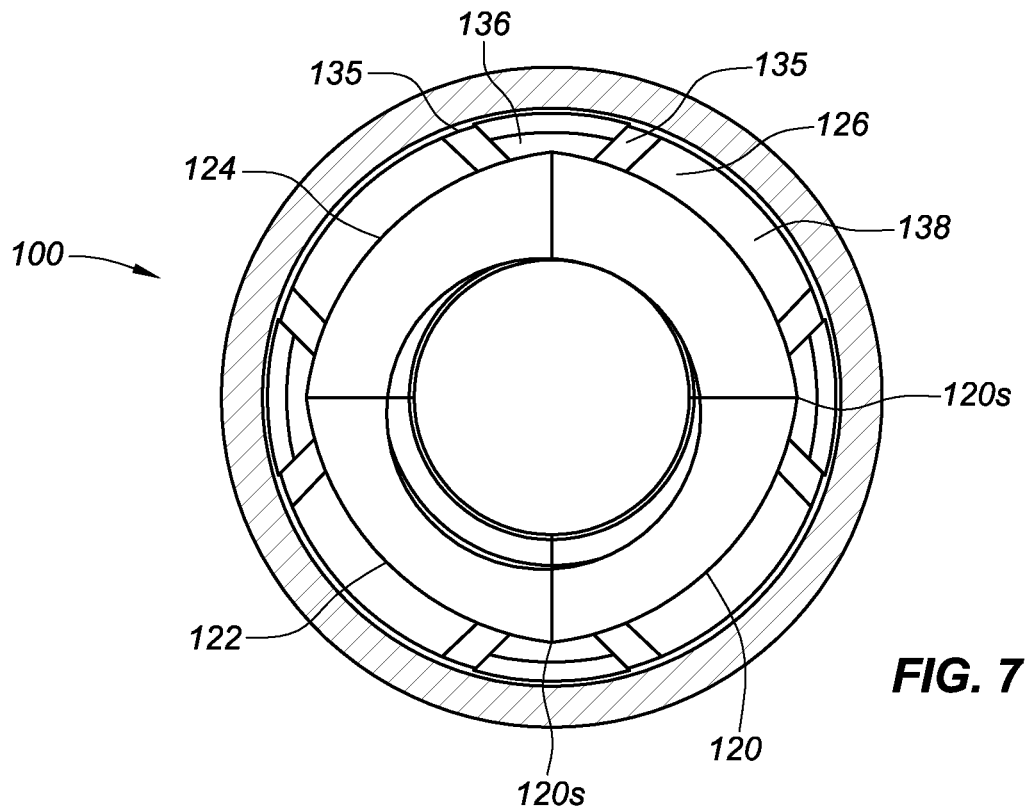
FIG. 7 is a plan view, taken in cross-section, showing the nut sections of the fastening nut assembly in the first position.

Referring to FIGS. 6A, 6B, 7, and 8, when the plurality of threaded nut sections 120, 122, 124, 126 are in an open position (FIGS. 6B and 8), the nut sections are circumferentially spaced from each other and concentrically aligned with the bore axis 500. In the open position, the threaded nut sections are closer to the distal end 102 of the fastening nut assembly 100 than they are when in the closed position (FIGS. 6A and 7). Specifically, FIGS. 6A and 7 show a first position where the nut sections 120, 122, 124, 126 can be considered as being in a closed position or configuration. In the closed position, the nut sections can be positioned and configured to engage with the corresponding threads of a fastener. FIGS. 6A and 7 show that the nut sections 120, 122, 124, 126 contact each other when in the closed position. In the closed position, the return spring 150 biases the washer 140 forward, thereby biasing the nut sections 120, 122, 124, 126 forward. As shown in FIG. 6A, when the nut sections 120, 122, 124, 126 are biased forward towards the proximal end 101 of the assembly 100, the shoulder 120f of the nut section 120 (and the corresponding front faces of the other nut sections) can be in contact with the tapered surface 136 of the collar 130, which acts as an interior camming surface against the shoulders 120f of the nut sections 120, 122, 124, 126 to urge the nut sections radially inward (toward each other) when the nut sections are biased in the proximal direction by the washer 140.

In operation with insertion of the threaded fastener, the threads of the fastener and the nut sections can each be understood as having a thread crest and a thread root. The thread crest is the high, prominent point of the thread or the most pronounced point of the thread, whether internal or external. The thread root is the lowest point of the thread or the bottom of the groove between two flanking surfaces of the thread. When the fastener is axially inserted, the thread of the fastener can push the thread of the nut section, pushing the nut section from a closed configuration (see FIGS. 6A and 7) in the distal direction and radially outward due to the camming tapered surface 136 to an open configuration (see FIGS. 6B and 8 discussed below). The nut section can be pushed radially outward until the thread crest of the fastener clears the thread crest of the nut section. That is, the diameter of the thread crest of the fastener is smaller than or approximately equal to the diameter of the thread crest of the nut section. At this point, the fastener can advance into the clamp-action fastening nut assembly 100. When the thread crest of the fastener passes the thread crest of the nut section as the fastener is advanced, the biasing of the spring 150 can bias the nut section forward against the tapered surface 136, bringing the nut section radially inward. In this way, the nut section can move radially inward such the thread crest of the nut section is moved towards the thread root of the fastener, thereby threadedly engaging the fastener and the nut section. As such, the fastener can be advanced into the clamp-action fastening nut assembly 100 without rotation until a desired position, at which point the radially inward movement of the nut section threadedly engages the fastener for rotational tightening of the fastener.

FIG. 7 is a sectional view along an axis of the assembly 100 showing the orientation of components when the nut sections 120, 122, 124, 126 are in the first or closed position. As shown, the nut sections can be in contact with one another in this closed state. Each of the nut sections 120, 122, 124, 126 can be retained in the opening 138 of the collar 130 between the ribs 134. As illustrated, the shoulder 120f of each of the nut sections can be understood as contacting the tapered surface 136 of the collar 130 near the side edges 120s of the nut section. In this position, the nut sections 120, 122, 124, 126 can provide a continuous threading for engagement with a corresponding fastener.

Figure 8:
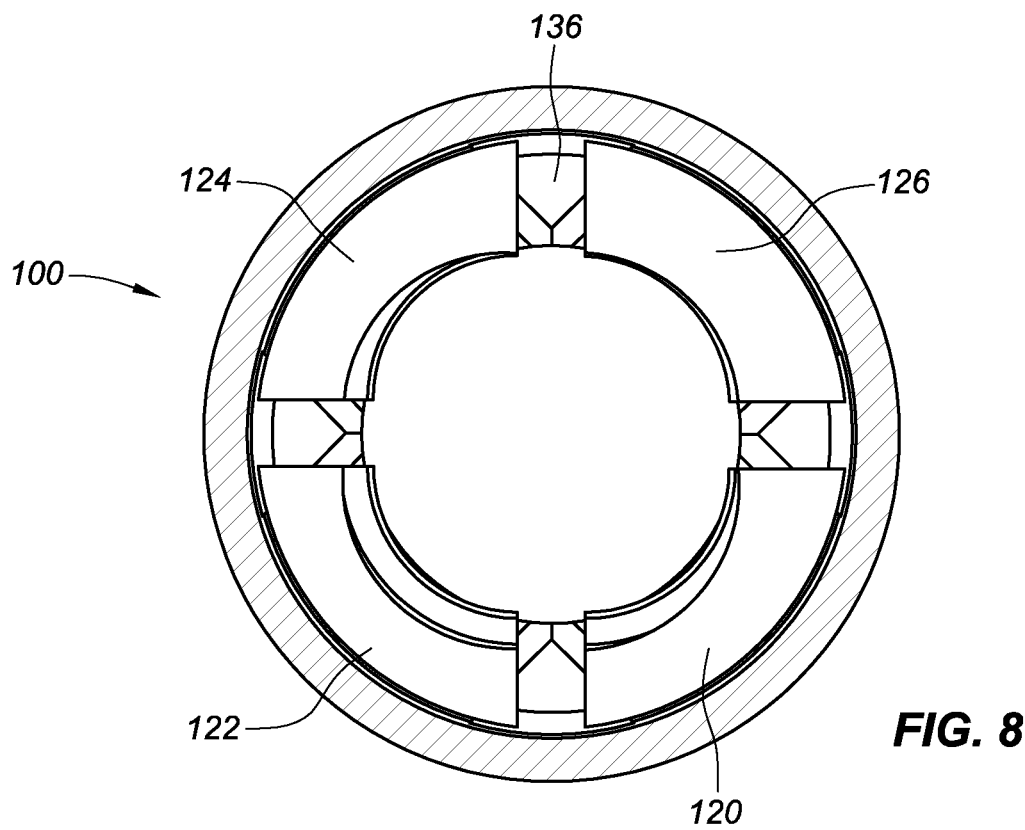
FIG. 8 is a plan view, taken in cross-section, showing nut sections of the fastening nut assembly in the second position.

FIGS. 6B and 8 show a second position where the nut sections 120, 122, 124, 126 can be considered as being in an open configuration or position. In the open position, the nut sections can be positioned such that the threads of the nut sections do not engage with corresponding threads of the fastener. As shown in FIG. 6B, when the fastener (not shown) is inserted into the proximal end of the assembly 100, the contact between the fastener and the nut sections 120, 122, 124, 126 biases the nut sections axially rearward (i.e., distally), thereby compressing the return spring 150. In a case where the fastener is inserted (see FIGS. 9A-9E for an exemplary corresponding fastener), the nut sections are biased rearward by the contact with the fastener. Additionally, due to the geometries of threading usually involving sloped surfaces, the nut sections are also biased radially outwardly by the contact.

In the open position, the return spring 150 is compressed by the rearward (distal) movement of the nut sections acting on the washer. Due to the tapered camming surface 136 of the collar 130, the contact with the shoulder 120*f* allows the nut sections to move radially outward when they are moved rearward or distally.

FIG. 8 shows a sectional view along the axis showing the orientation of components when the nut sections 120, 122, 124, 126 are in the second (open) position. As shown, the nut sections can be spaced apart from one another equidistantly in the second position. The positioning of the nut sections can be guided by the interfacing of the respective guide surfaces 120*r* of the nut sections and the side surfaces 137 of the collar 130. (See FIGS. 3-5 for exemplary embodiments.) The side surfaces 137 of the collar 130 can act as guide rails to move the nut sections 120, 122, 124, 126 radially when the nut sections are biased apart by the fastener. Each of the nut sections 120, 122, 124, 126 can be retained in the opening 138 of the collar 130 between the ribs 134. As illustrated, the shoulder 120*f* of each of the nut sections can be understood as contacting the tapered surface 136 of the collar 130 near the side edges 120*s* of the nut section. In the second (open) position, the nut sections 120, 122, 124, 126 can move radially enough to provide clearance for the fastener to be inserted axially and clearing the threads, thereby avoiding a need for rotation.

Figure 9A:
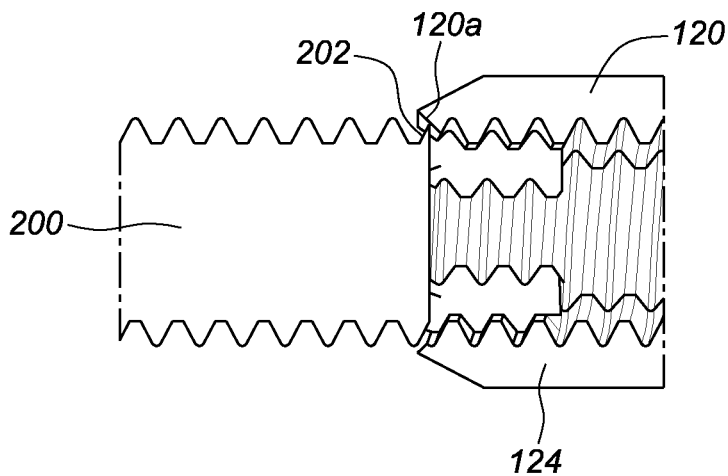
FIGS. 9A-9E show various stages of engagement between a fastener and the fastening nut assembly in accordance with an aspect of the present disclosure.

FIGS. 9A-9E illustrate an exemplary embodiment of the progression of movement of the nut sections 120, 122, 124, 126 upon the insertion of a fastener 200 in the assembly 100. FIG. 9A illustrates when the threads 202 of the fastener 200 make initial contact with the nut sections 120, 122, 124, 126 (exemplary nut sections 120 and 124 are shown). The threads 202 of the fastener 200 can make initial contact with the front faces 120*a* etc. of the nut sections. As the front faces of the nut sections have an inward taper or sloped surface, the insertion of the fastener 200, in combination with a relatively weaker forward biasing of the return spring 150 (see exemplary FIGS. 6A and 6B), results in the nut sections 120, 122, 124, 126 moving rearward and radially outward.

Figure 9B:
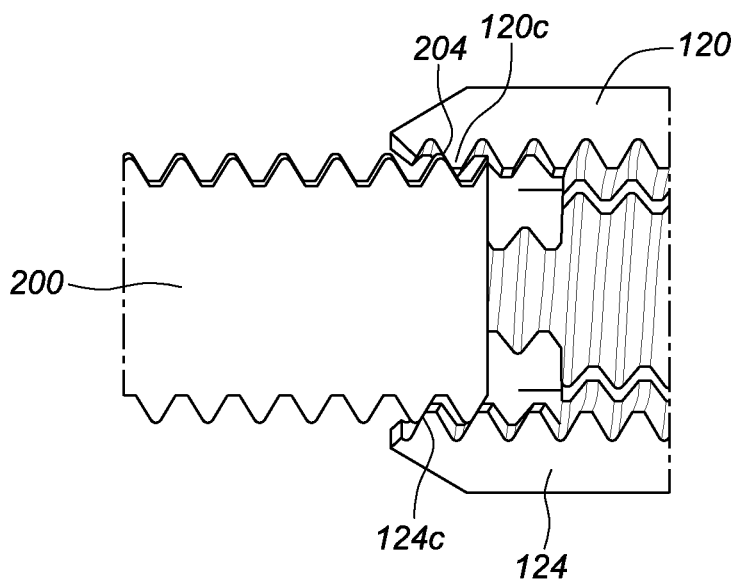

FIG. 9B shows the nut sections displaced radially enough to allow for the fastener 200 to enter the assembly 100. In FIG. 9B, the fastener 200 has been partially inserted into the assembly 100. In this state, the thread flanks 120*c* etc. of the nut sections engage with the thread flanks 204 of the fastener 200. As the nut sections 120, 122, 124, 126 form a continuous thread across the nut sections, the thread flank 204 of the fastener 200 can simultaneously contact the thread flanks (thread flanks 120*c*, 124*c* being shown as exemplary thread flanks) of each of the nut sections 120, 122, 124, 126. The interaction between the sloped thread flanks of the nut sections with the thread flank of the fastener from the insertion of the fastener 200, in combination with a relatively weaker forward biasing of the return spring 150 (see exemplary FIGS. 6A and 6B), results in the nut sections 120, 122, 124, 126 moving rearward and radially outward.

Figure 9C:
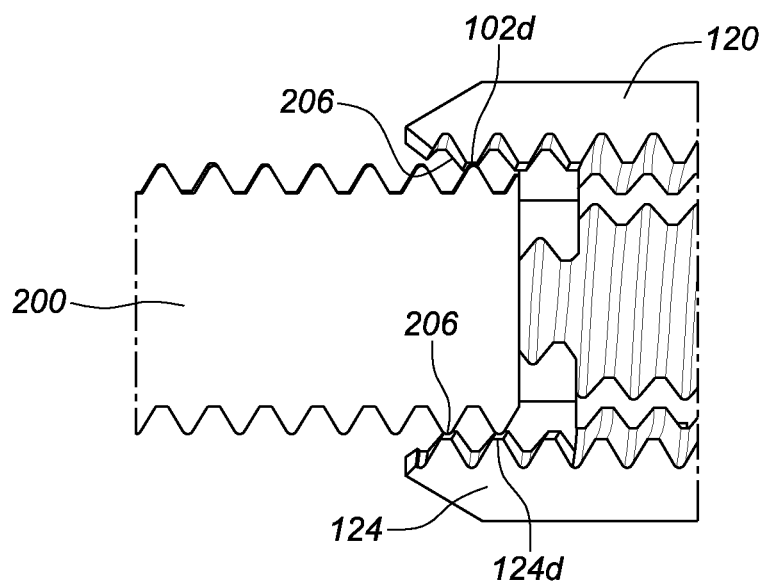

FIG. 9C shows a following scenario resulting from the nut sections 120, 122, 124, 126 moving rearward and radially outward. As a result of the movement of the nut sections, there is a point reached where the thread flanks of the nut sections 120, 122, 124, 126 move radially outward beyond the thread flanks 204 of the fastener 200. At this point, the fastener 200 is able to progress inward (i.e., distally with respect to the assembly 100) as the thread crests 206 of the fastener move past the thread crests 120*d* of the nut sections.

Figure 9D:
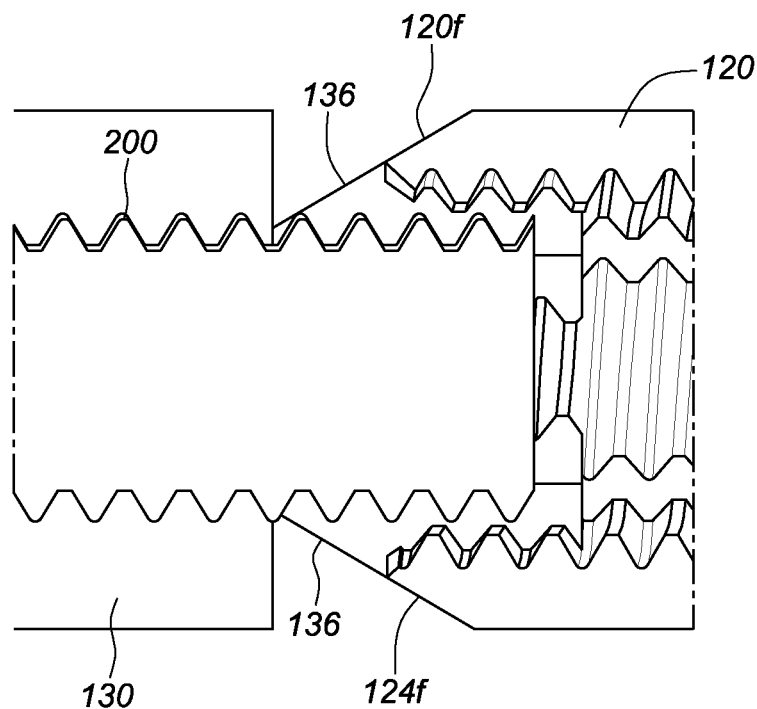

FIG. 9D illustrates a scenario after the thread crests 206 of the fastener 200 have moved past the thread crests of the nut sections 120, 122, 124, 126. As illustrated, at this point, there are no threads 202 of the fastener 200 biasing the nut sections rearward and radially outward after the crests have passed each other. As visualized from FIG. 6B, the forward biasing force of the return spring 150 moves the nut sections 120, 122, 124, 126 radially inward in a clamping action due to the tapered front faces or shoulders of the nut sections interfacing with the tapered camming surface 136 of the collar 130. This clamping action provides something akin to a ratchet effect as the fastener advances axially in the bore defined by the nut sections.

Figure 9E:
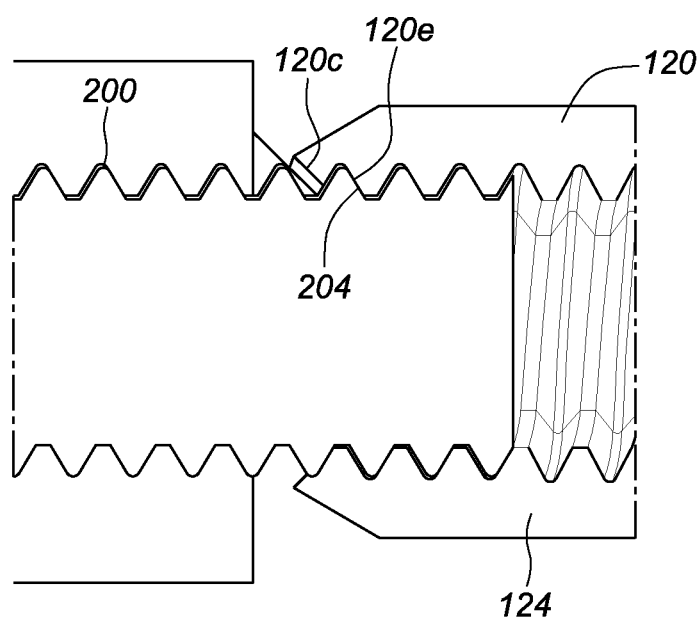

FIG. 9E illustrates a scenario following the biasing and radially inward movement of the nut sections 120, 122, 124, 126 after the thread crests 120*d*, 206 have passed each other. As a result of the radially inward, clamping action movement of the nut sections, the threads of the fastener 200 and the nut sections are brought back into contact. Thus, each of the fastener thread flanks 204 can contact the next nut section thread flank 120*e* after the thread flank 120*c* to bias the nut sections radially outward again. This allows for iteratively biasing the nut sections radially outward with an axial insertion of the fastener 200 without needing rotation of the fastener.

Additionally, as the return spring 150 can bias the nut sections 120, 122, 124, 126 radially inward, the threads of the nut sections are in position to engage with corresponding threads of the fastener 200 when the desired axial insertion depth of the fastener is reached. At this point, the assembly 100 or the fastener 200 can be rotated relative to the other to secure the fastener 200 to the desired torque.

Figure 10:
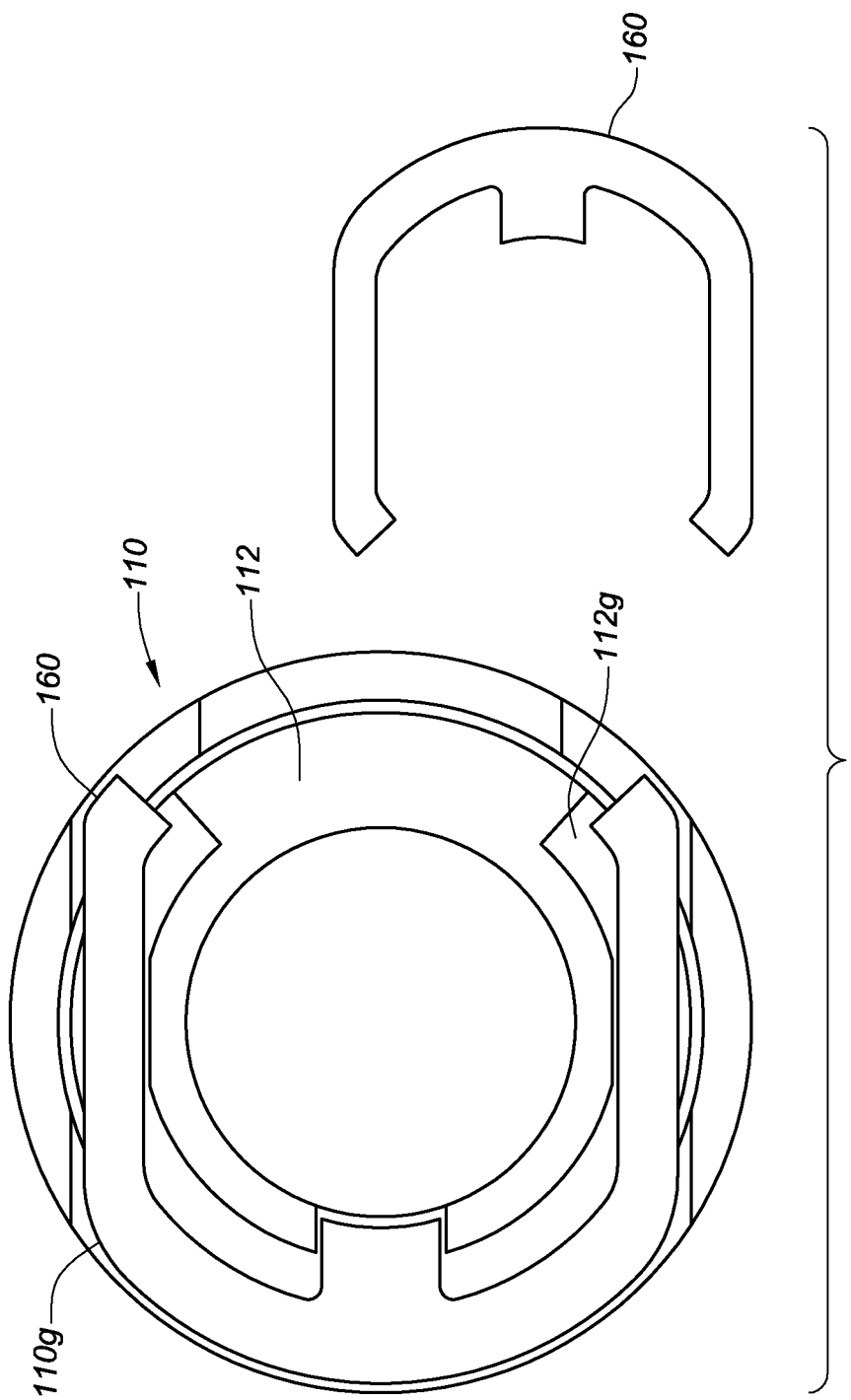
FIG. 10 is a plan view, taken in cross-section, showing a retaining clip that can be used to fix the rotation of a cap and a main body of the fastening nut assembly.

FIG. 10 is a section plan view illustrating an optional retaining clip 160. The retaining clip 160, which may have the form of an E clip, can be used to retain the cap 110 to the main body 112 to prevent rotation of one relative to the other. The cap 110 can have a retaining groove 110*g* and the main body 112 can have a retaining groove 112*g*, whereby the retaining grooves 110*g*, 112*g* are configured in registration to accept the retaining clip 160. The retaining clip 160 can thus fix the position of the cap 110 relative to the main body 112. Although a retaining clip 160 configured as an E clip may be provided in some embodiments, the size and shape of the retaining clip 160 are selected to retain the cap 110 to the main body 112. The retaining clip 160 can also prevent the cap 110 from being pulled off axially, and it may also retain the threaded nut sections from moving beyond a defined path.

Figure 11:
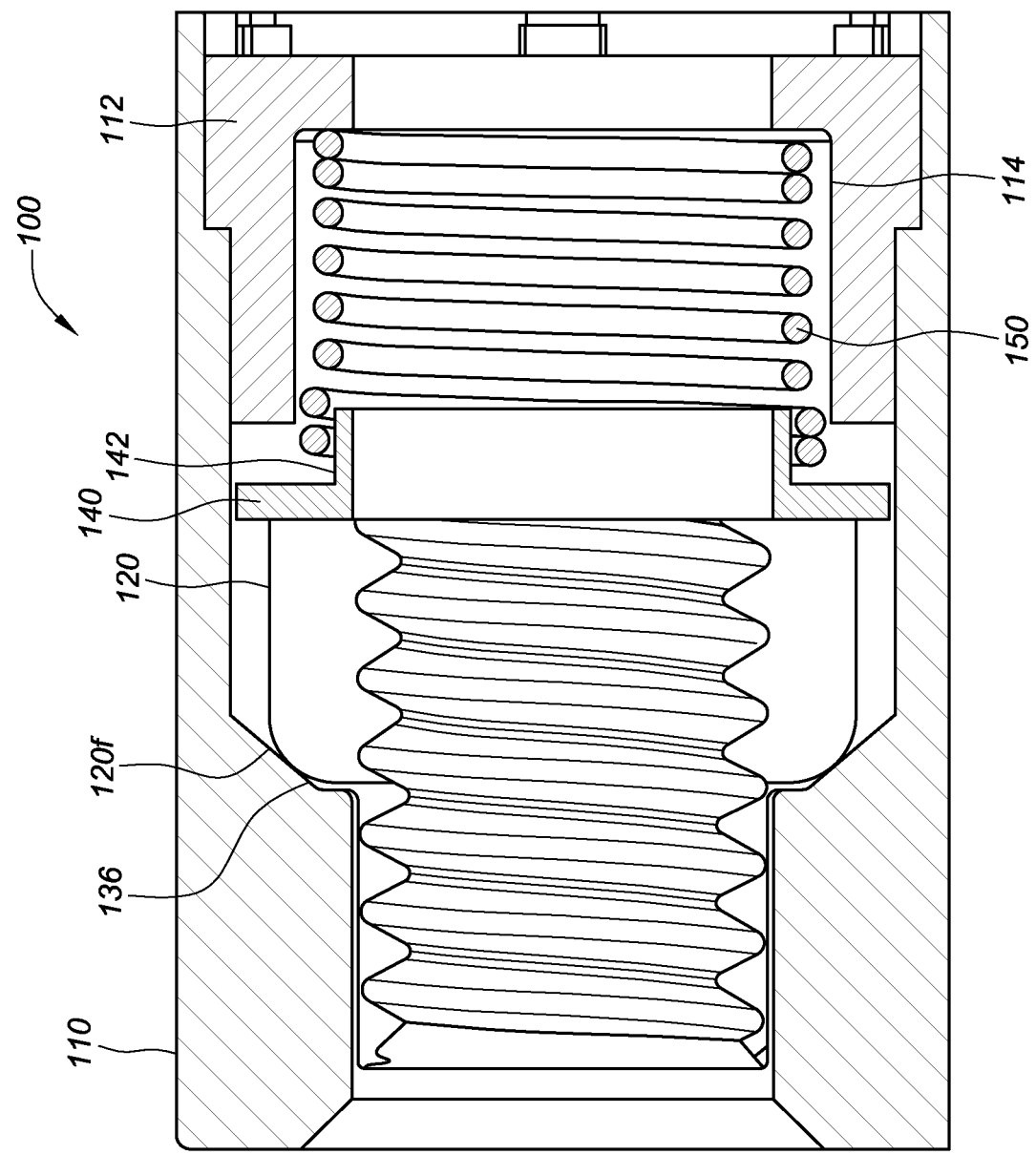
FIG. 11 is a plan view, taken in cross-section, of a fastening nut assembly in accordance with an aspect of the present disclosure.

FIG. 11 illustrates an exemplary embodiment where the return spring 150 can be retained in an interior cavity 114 of the main body 112. The cap 110 can include an integrally formed collar with the ribs 134 having tapered surfaces 136 for interfacing with the shoulders 120*f* of the nut sections 120, 122, 124, 126. Additionally, the washer 140 can have a rear surface formed with a central cylindrical protrusion or boss 142, thereby defining an annular spring seat around the boss 142. The cylindrical protrusion 142 can be configured to accommodate a first end of the return spring 150 on an outer diameter. Additionally, the main body 112 can have the interior cavity 114 configured to accommodate a second end of the return spring 150.

The cap 110 can be manufactured by a draw stamping, casting, metal injection molding or other methods. The ribs 134 can be manufactured by a draw stamping, casting, metal injection molding or other methods. The cap 110 and the rib 134 can be separate components, coupled together, or integrally formed.

In certain embodiments, the angle or slope of the tapered surface 136 can be predetermined to result in less linear axial travel relative to radial travel for the nut sections. The interior of the cap 110 can act as a stop for the radial movement of the nut sections. Having the linear axial travel less than the radial travel can aid in lessening engagement of the following threads of the fastener and the nut sections.

The nut sections may, in some embodiments, be made individually, whereby the threading is preformed, such as by means of metal injection molding, stamping/coining, casting or other production means, into each section, and then the sections are assembled in a specified order to the next correlating section. The nut sections can be made as a blank, with all pertinent features included besides the threading, whereby the correlation of the next nut section does not matter until the tapping or thread forming operation has been performed, whereby the nut sections would then be a part of a whole.

Figure 12A:
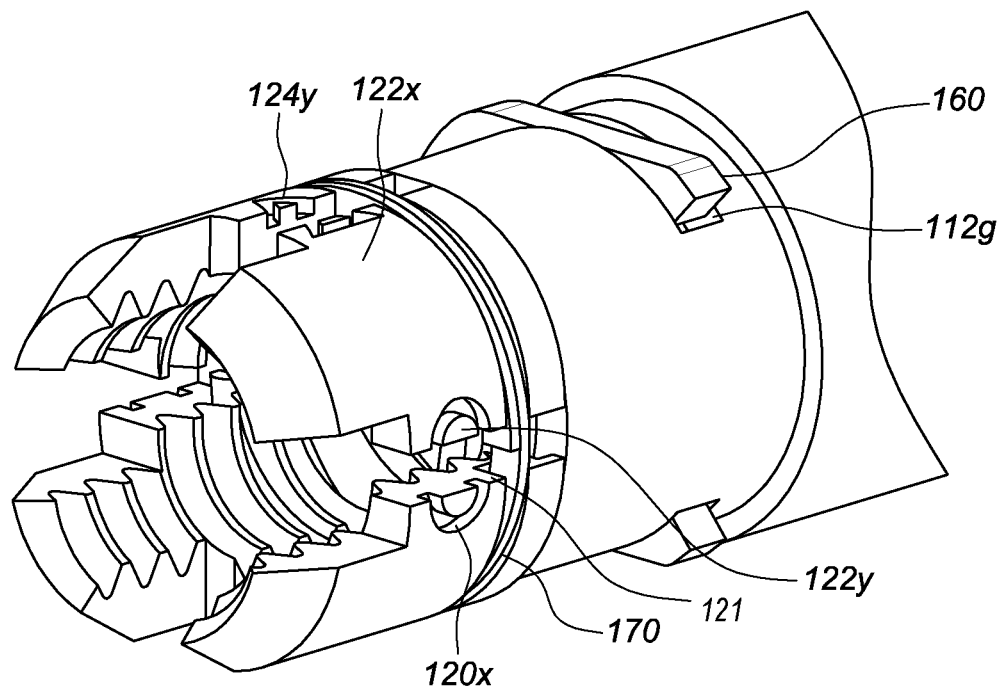
FIGS. 12A and 12B are perspective views of a fastening nut assembly with alignment marks, a retaining ring, and a retaining clip in accordance with an aspect of the present disclosure.
Figure 12B:
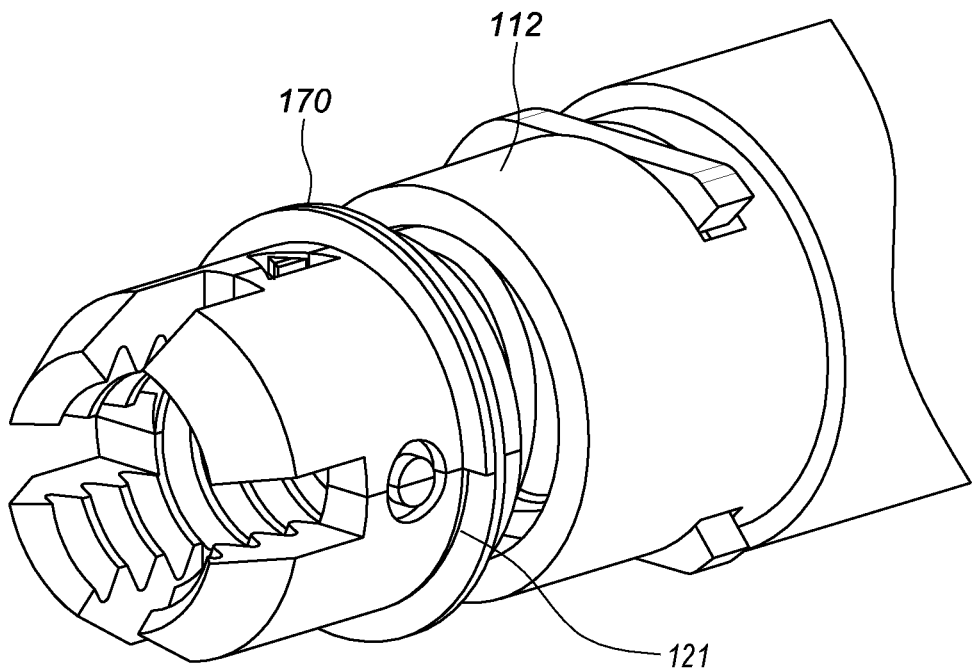

FIGS. 12A and 12B illustrate an embodiment of the assembly 100 where the nut sections have edge alignment marks 120x, 120y, 122y, 122x, 124y. The alignment marks can be provided on each nut section 120, 122, 124, 126, with a different mark on each of the nut sections. The alignment marks of contacting edges of the nut sections can form a recognizable geometric shape or symbol. As each of the nut sections may have a different marking, the nut sections can be easily arranged to form a continuous thread by arranging the nut sections in the correct order by viewing the alignment marks. For example, two contacting edges 120x, 122y can have alignment marks that form a circle when put together. Also, two contacting edges 122x, 124y can have alignment marks that form a triangle when put together. Alternative geometric shapes, singular or plural, may be used for the alignment marks. In cases with four nut sections, the alignment marks can form four different symbols.

Additionally, FIG. 12A illustrates the above-mentioned placement of the retaining clip 160 in the annular groove 112g in the main body 112. FIG. 12A also illustrates a groove 121 on each of the nut sections 120, 122, 124, 126. The groove 121 of each of the nut sections can together define a continuous circular groove around the nut sections that accommodates a retaining ring 170, which may be a snap ring. The retaining ring 170 can keep all of the nut sections aligned and limit travel of the nut sections. FIG. 12A shows an open position of the nut sections, where the retaining ring 170 can prevent further radial opening. FIG. 12B illustrates the assembly in a second position, where the nut sections are contacting one another in the radially closed position. In this case, the width of the retaining ring 170 can sized relative to the depth of the groove 121 to hold the nut sections in the desired position. The radial thickness of the ring 170 can be sized to correspond to be larger than the radial displacement of the nut sections from the open position to the closed position. The groove 121 can have a depth sized to fit at least a portion of the ring 170. As such, the ring 170 can be retained in the groove through its travel between the open position and the closed position.

Figure 13:
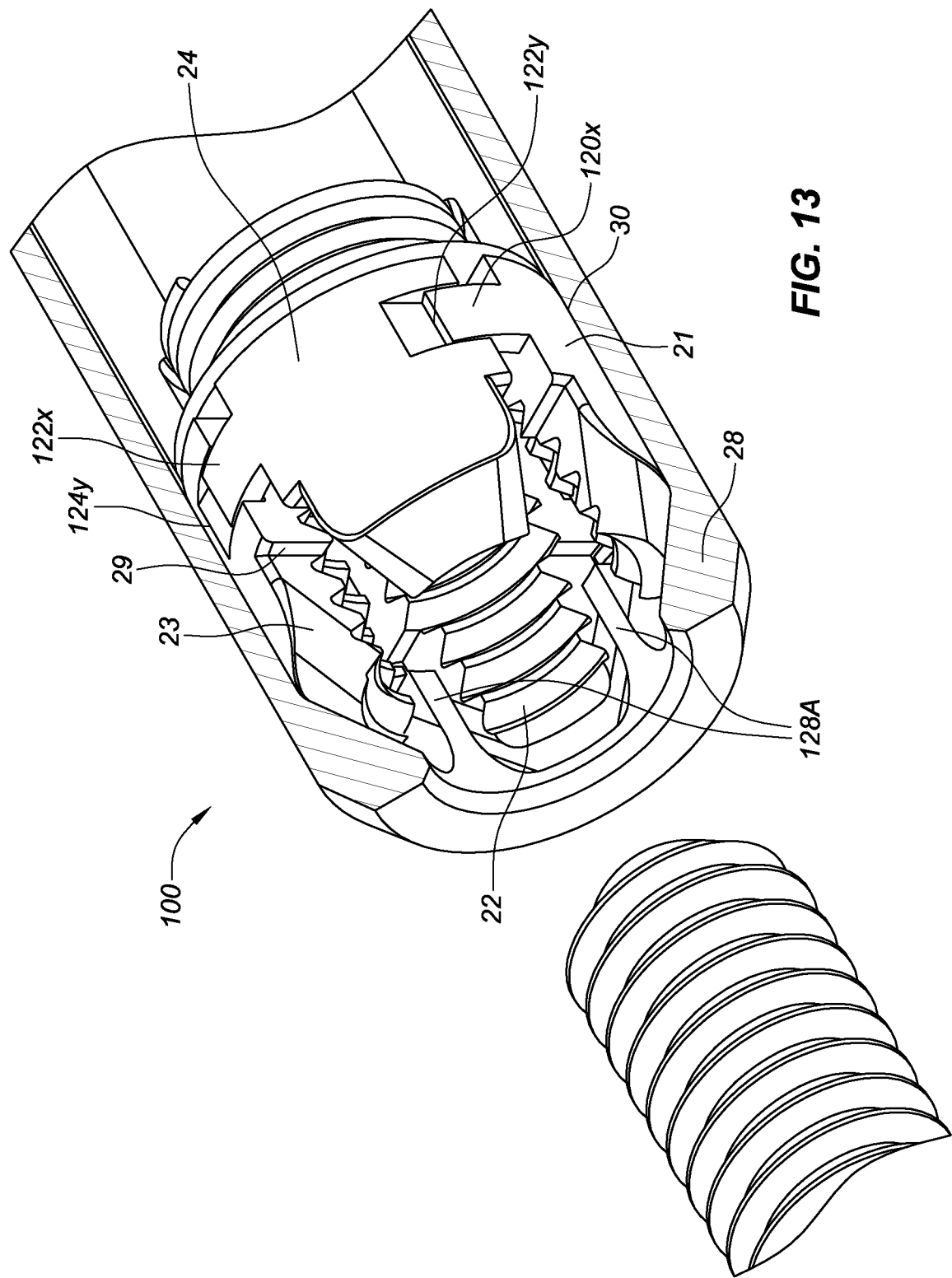
FIG. 13 is a perspective view of a fastening nut assembly with alignment marks with pockets and grooves for alignment and retention of the nut sections.

FIG. 13 illustrates an exemplary embodiment where the nut sections 120 have alignment marks 120x, 122y, 122x, 124y with pockets 122y, 124y and tabs 120x, 122x. The pockets can correspond to respective tabs of the neighboring nut section, and they can act as an alignment aid to keep the threads of the nut sections in helical alignment. This can help keep the tapered faces of the nut sections and cap in full contact, when at rest or torqued, to prevent the nut sections from skipping a tooth where one or multiple of nut sections could become out of alignment and engaged in the next rearward tooth of the fastener, thereby resulting in the possibility of uneven loading of the nut sections to the cap. Additionally, pairs of pockets and tabs can be sized differently amongst the nut sections, to further aid in orientation of the nut sections relative to one another.

Figure 14:
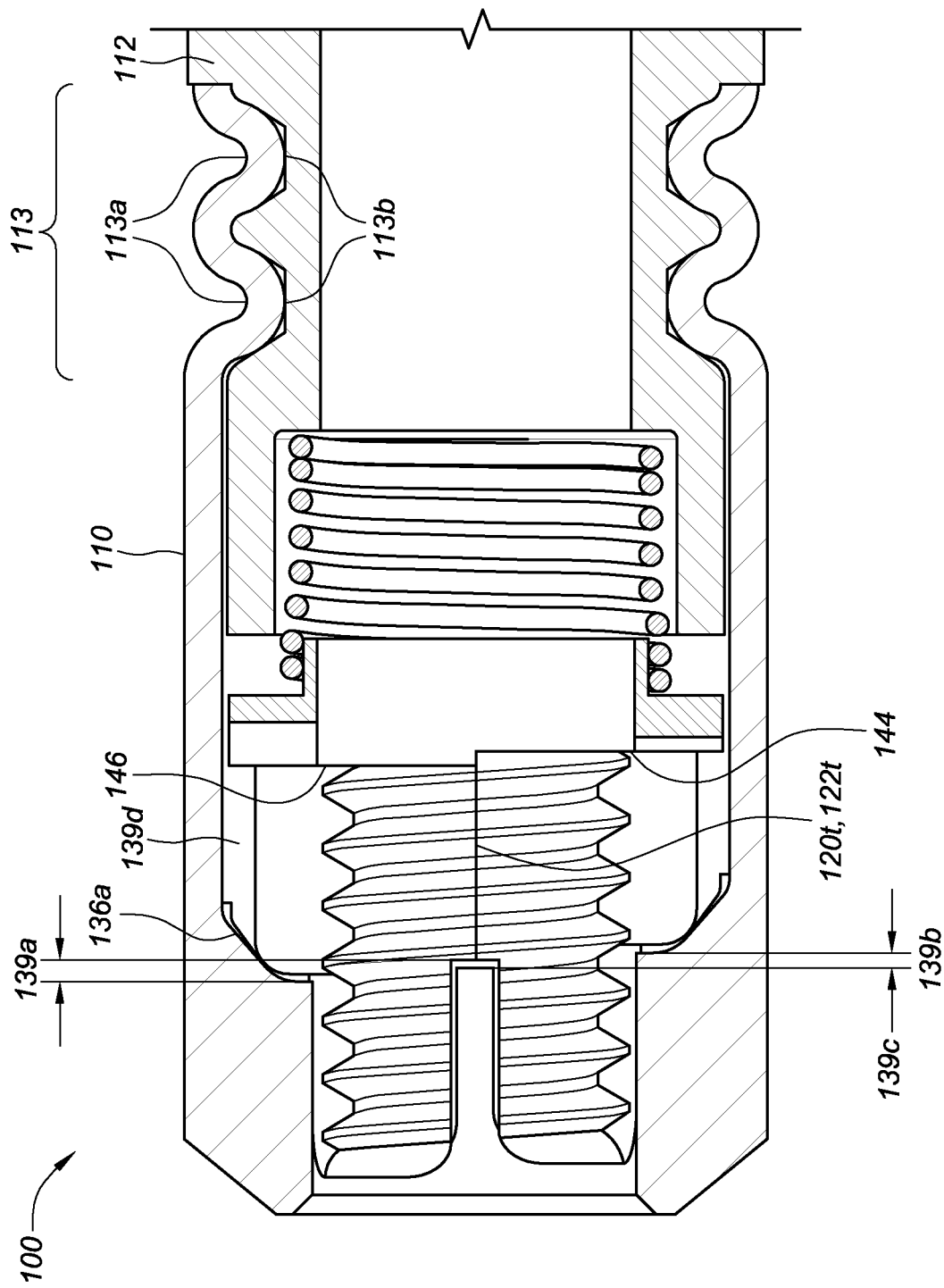
FIG. 14 is a plan view, taken in cross-section, of a fastening nut assembly having helically placed nut sections and an exterior crimp in accordance with an aspect of the present disclosure.

FIG. 14 illustrates an embodiment of the assembly 100 having a crimp 113 to prevent the rotation of the cap 110 relative to the main body 112. The crimp 113 can consist of two indentations 113a into the cap 110 and the main body 112. The indentations of the cap 113a fill material of the cap into the main body 112. The main body can have two tabs 113b corresponding to the indentations 113a. In some embodiments, the tabs 113b can be formed by the crimping action. In some embodiments, the tabs 113b may be preformed on the main body 112 and configured to receive the cap 110 when a crimping action is performed. Alternative to crimping may be used, such as, without limitation, welding, gluing, staking, piercing, or swaging, whereby material is added or displaced to create a positive engagement between the cap 110 and the main body 112. The tabs 113b can be perpendicular to the axis of the assembly 100 in order to prevent the rotation of the cap 110 relative to the main body 112.

Also, FIG. 14 illustrates an embodiment of the cap 110 and the nut sections 120, 122, 124, 126 wherein the nut sections are helically positioned in the assembly. The cap 110 can have the tapered surfaces axially offset, as illustrated with tapered surfaces 136a and 136b. A forward stop edge 139a of the first tapered surface 136a can be axially offset from a forward stop edge 139b of the second tapered surface 136b. Corresponding pockets 139d for each of the nut sections are staggered axially in a fashion that matches the helical pitch of the fastener and threading to keep each nut section properly aligned with its matching counterparts.

The amount of offset 139c can allow for the use of a single nut section design to be used for all of the nut sections; that is, the nut sections 120, 122, 124, 126 are identical. The offset 139c can allow for the threads 120t at an edge of a first nut section 120 to match the threads 122t at an edge of a second nut section 122 when the thread pattern of each of the nut sections is identical between the nut sections. This can provide for a simpler assembly procedure, as the nut sections would not need to be in a specific arrangement in order to achieve the desired continuous thread.

The axial distance of offset from one pocket 139d to the next can be defined by:

Distance $D_o$ of offset from one pocket to the next= (pitch of fastener)*(1/n), where $n$ is the number of nut sections.     Equation 1:

The formula of Equation 1 can be used to find the linear offset of the pocket that the nut section comes to rest against that is around the axis of the cap. For example, with 5/32 threading and four nut sections: $D_o=(1/32)*(1/4)=0.0078125$ in. offset from one pocket to the next.

Additionally, the washer 140 can have corresponding steps (illustrated by 144, 146) on a surface facing the nut sections. In this way, the washer 140 can be loaded evenly and also bias the nut sections evenly, as the nut sections move between open and closed positions.

The nut sections can, if desired, be made individually, whereby the threading is preformed, such as by means of metal injection molding, stamping/coining, casting or other production means, into each section, and then the sections are assembled in a specified order with the next correlating section. Alternatively, the nut sections can be identical so that the order in which the sections are assembled is not important.

Figure 15:
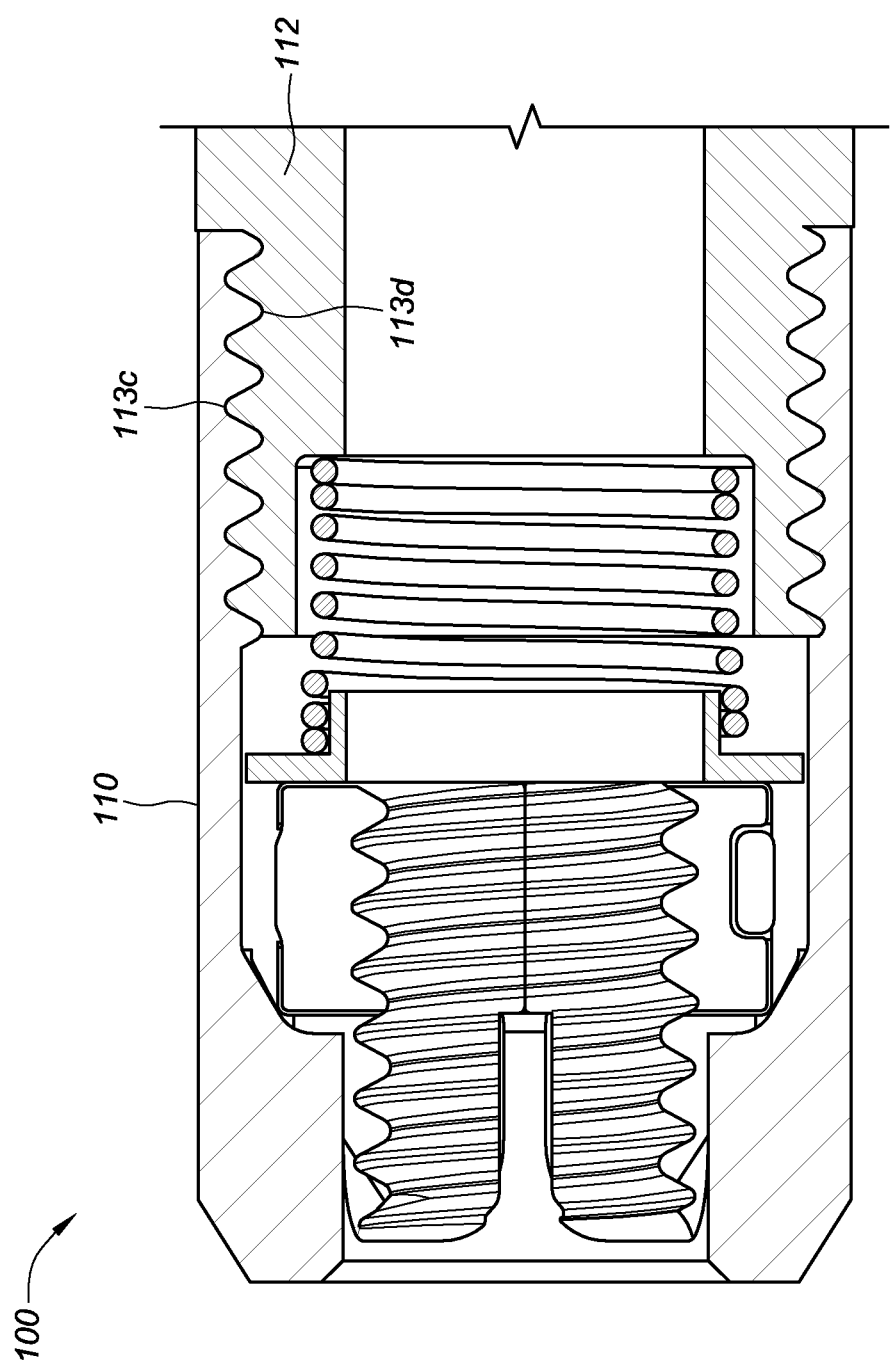
FIG. 15 is a plan view, taken in cross-section, of a fastening nut assembly having threading to couple the cap and the main body in accordance with an aspect of the present disclosure.

FIG. 15 illustrates an embodiment using threading to secure the cap 110 to the main body 112. The cap 110 can have a first thread 113c at a distal end, and the main body 112 can have a second thread 113d at a proximal end. The first and second threads 113c, 113d mate with one another and allow the cap 110 to securely mate to the main body 112, thereby preventing relative rotation.

Figure 16:
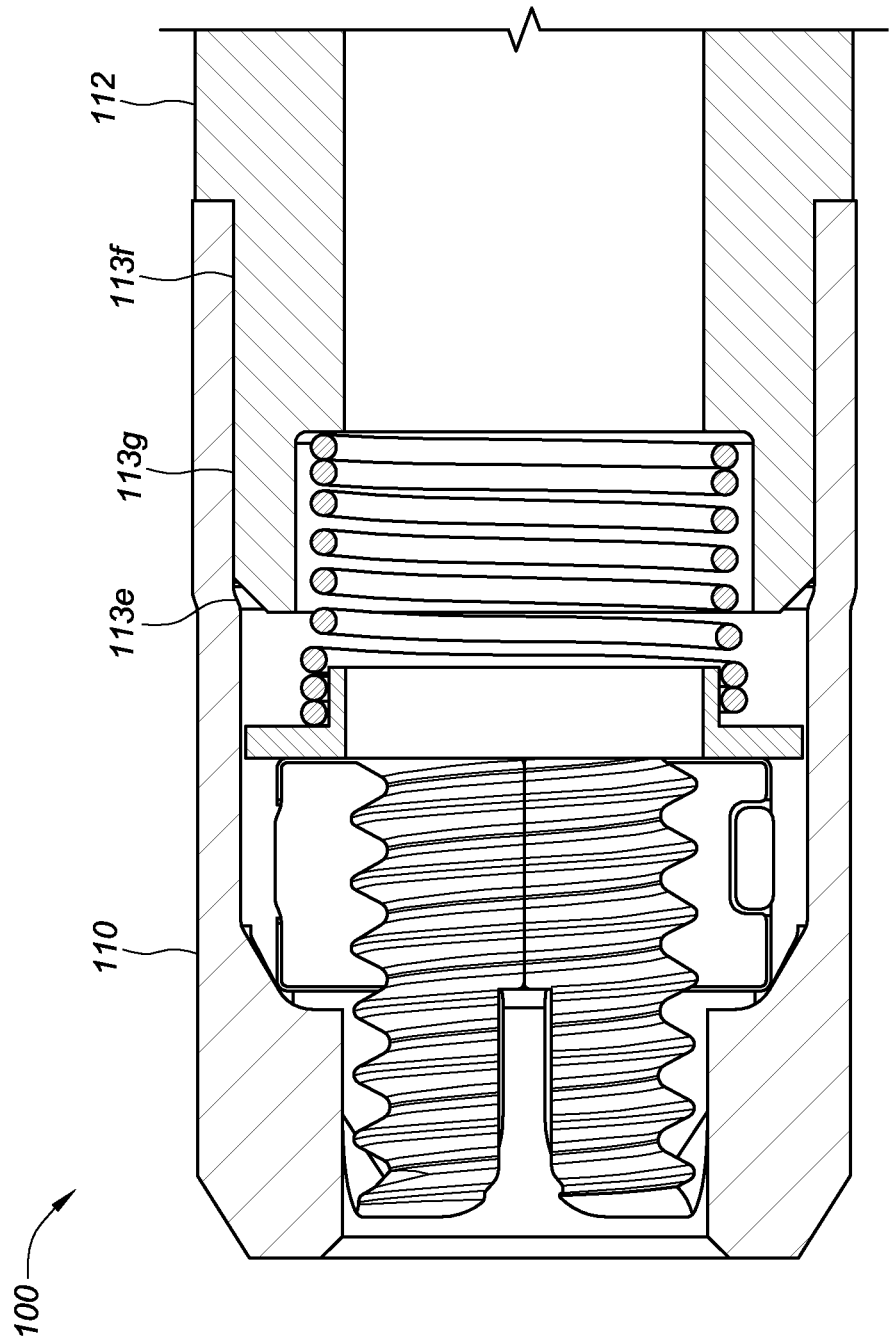
FIG. 16 is a plan view, taken in cross-section, of a fastening nut assembly having an interference fit to couple the cap and the main body in accordance with an aspect of the present disclosure.

FIG. 16 illustrates an embodiment using an interference fit to secure the cap 110 to the main body 112. An inner diameter 113e of the cap 110 is smaller than an outer diameter 113f of the main body, where the cap 110 is configured to couple with the main body 112. As such, the cap 110 is configured to have an interference fit 113g with the main body 112 upon assembly. The interference fit 113g results in a deformation of the cap 110 in the area of the interference fit 113g as the cap 110 is forced to expand radially to accept the main body 112. The interference fit can thereby prevent rotation of the cap 110 relative to the main body 112.

Figure 17:
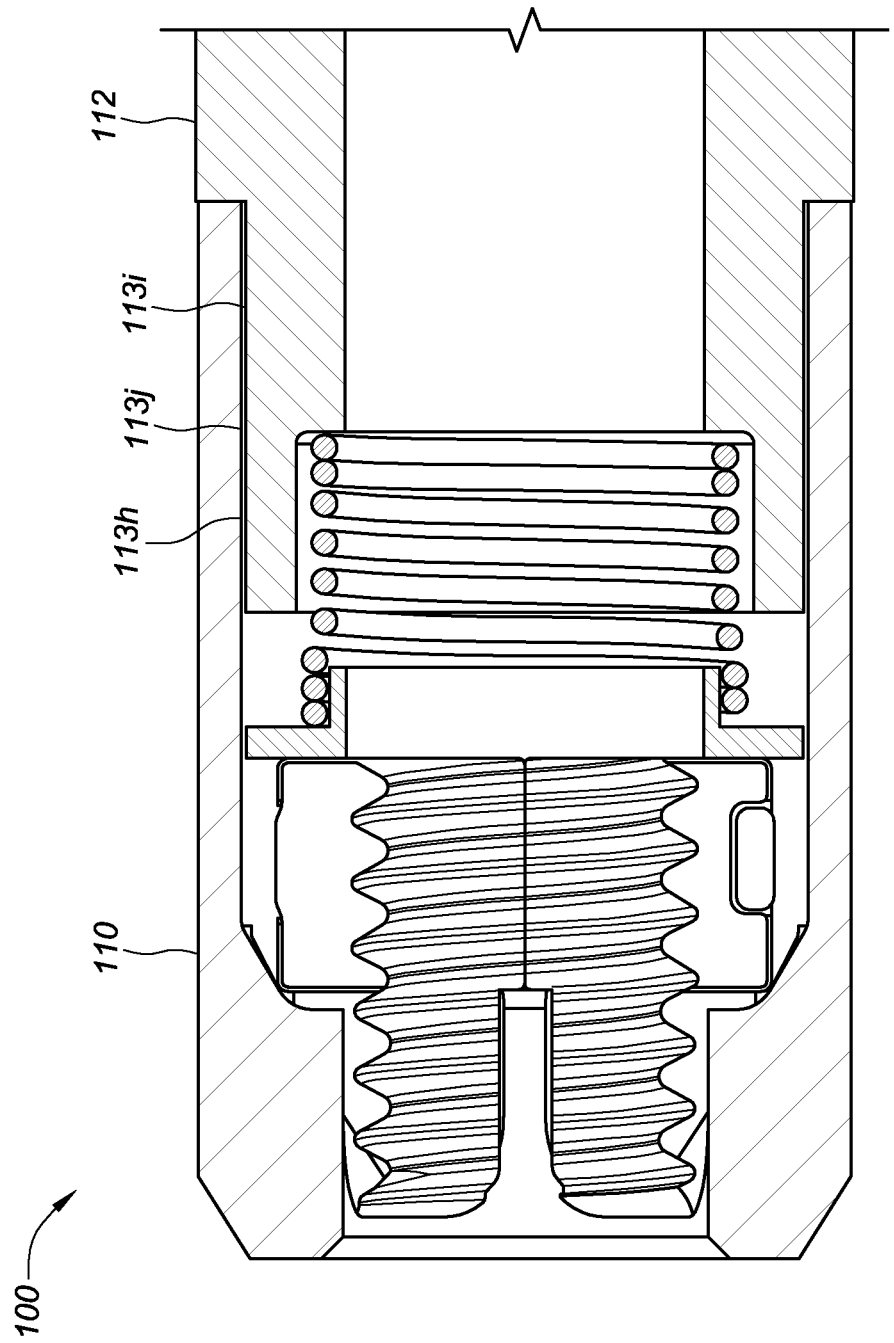
FIG. 17 is a plan view, taken in cross-section, of a fastening nut assembly having a running fit for adhesive to couple the cap and the main body in accordance with an aspect of the present disclosure.

FIG. 17 illustrates an embodiment using an adhesive to secure the cap 110 to the main body 112. The cap 110 can have an inner diameter 113h sized to have a running fit 113j with an outer diameter 113i of the main body 112. The running fit 113j can allow for application of an industrial adhesive, thereby preventing the ability of the cap to rotate independently of the main body.

Figure 18A:
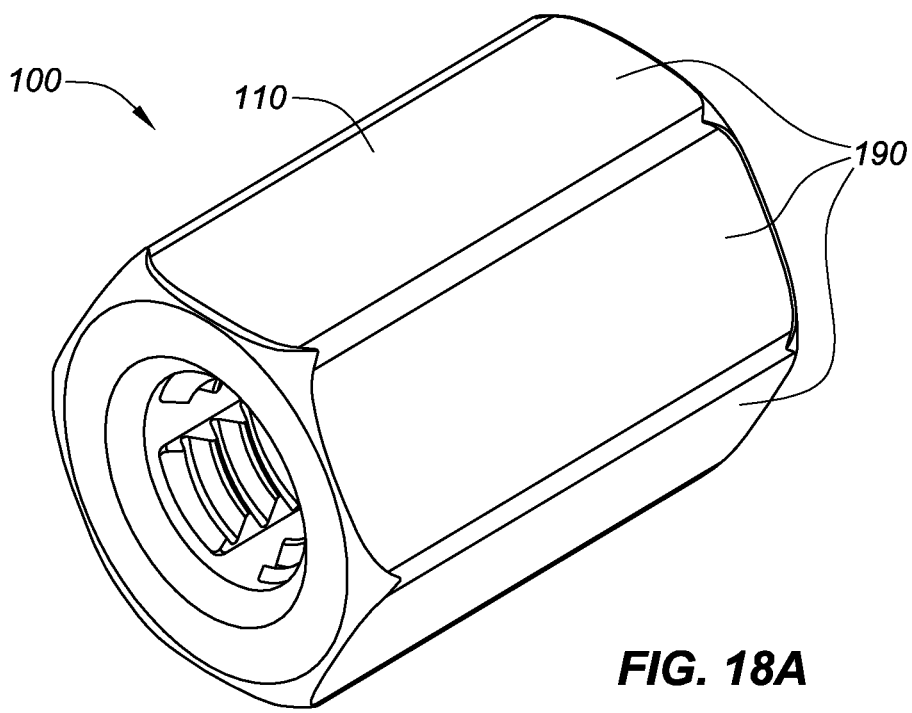
FIG. 18A is a perspective view of a fastening nut assembly having an exterior hexagonal shape in accordance with an aspect of the present disclosure.
Figure 18B:
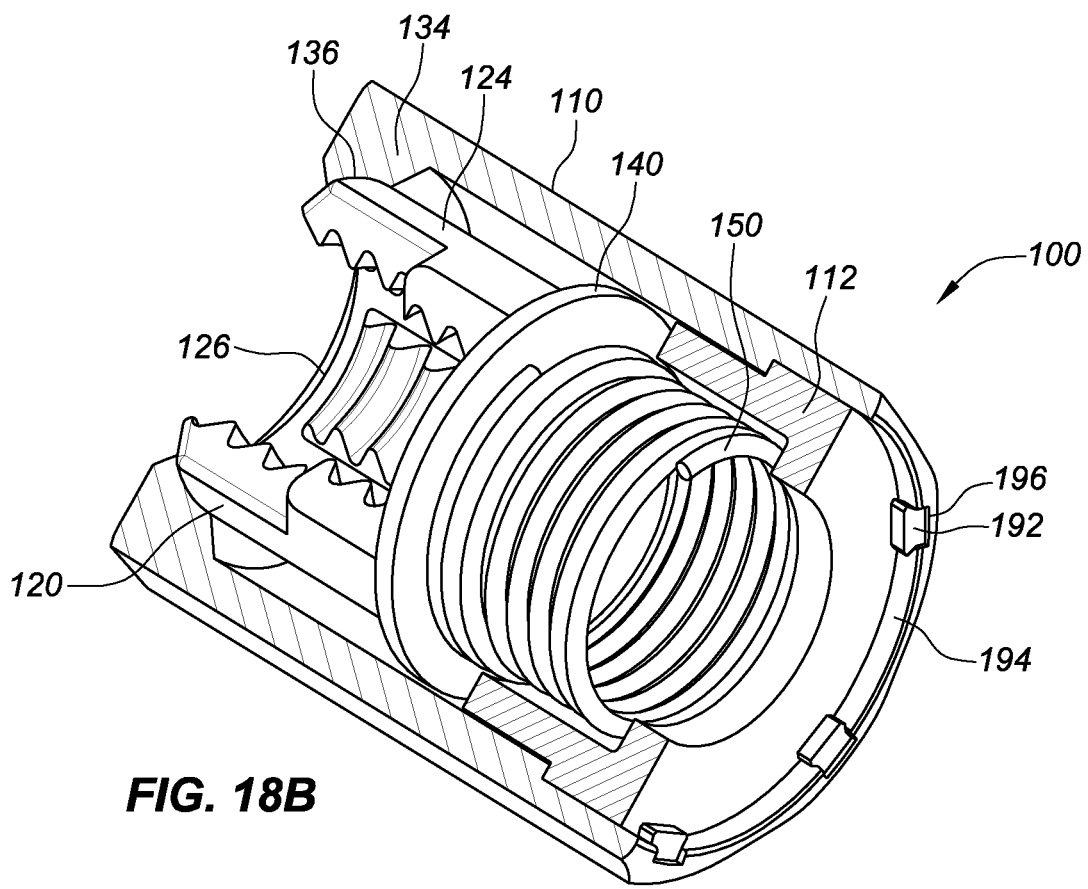
FIG. 18B is a perspective view, taken in cross-section, of the arrangement of the nut sections, washer, return spring, and main body housed within the cap of the hexagonally-shape embodiment of FIG. 18A.

FIGS. 18A and 18B are perspective views of an assembly 100 wherein the cap 110 and main body 112 are shaped to define a general nut shape. FIG. 18A shows the exterior of the clamp-action nut assembly 100 configured as a hexagon with six sides 190, thereby matching the configurations of hex head fasteners and nuts. The assembly 100 can thus be sized for use with conventional wrenches and socket drivers. Furthermore, the hexagonal shape allows the assembly 100 to be used as a standalone nut, whereby it can be attached to any fastener and tightened with commonly-sized wrenches.

FIG. 18B is a perspective sectional view taken along the axis of the assembly 100. The exterior hexagonal shape of the assembly can be formed solely by the cap 110. The main body 112 can be completely inset inside the cap 110. In this way, every component of the assembly 100 can be housed inside of the cap 110. The nut sections 120, 122, 124, 126, washer spring 140, and return spring 150 can be arranged at least as shown in the illustrative embodiments of FIG. 6A, 6B, or 11.

At one end of the assembly 100, the main body 112 can be inset by a distance 194 from the edge of the cap 110. The cap 110 can have recesses 196 circumferentially provided for retention of the main body 112. Stakes 192 can be configured to fit in the recesses 196 to retain the main body 112. The nut sections can be prevented from rotation relative to the cap 110 by the ribs 134 and the tapered surface 136 that can be integrally formed with the cap 110. The main body 112 can also have a recess to accept a portion of the stake 192 to further aid in limiting rotation of components inside the cap 110.

The cap 110 can be staked, swaged, crimped, pierced or otherwise captured around the main body 112 to retain the housing to the assembly while also containing all parts of the device. This feature can also prevent the cap 110 from rotating independently from the main body 112.

Additionally, the return spring 150 also can be fixed rotationally, by staking, swaging, crimping, piercing, or other means, to at least one of the cap 110 and the main body 112. Alternatively, the return spring 150 can be free to rotate between the two opposing components.

The present disclosure can provide a clamp-action fastening nut assembly comprising: a main body, a plurality threaded axial nut sections, and a spring, the spring being paired to the main body, wherein the spring is configured to bias the threaded nut sections towards a first position, wherein, when in the first position, the threaded nut sections are configured to engage with a correspondingly threaded fastener.

The present disclosure further describes the insertion of the correspondingly threaded fastener resulting in the threads of the fastener contacting the threaded nut sections and biasing the threaded nut sections backwards, thereby compressing the spring. The present disclosure can further provide that the threaded nut sections are biased radially outward to a second position, whereby the fastener is able to be inserted axially past the threaded nut sections without rotation.

The present disclosure can provide for one or more of: (1) a main body that has a through-hole along an axial direction, the through hole being configured to receive the fastener; (2) a retaining ring configured to retain the threaded nut sections from moving beyond a defined path; (3) a retaining clip configured to couple the cap to the main body to prevent rotation of one relative to the other; and (4) a crimp configured to couple the cap to the main body to prevent rotation of one relative to the other.

The present disclosure can further provide a method of assembling a clamp-action fastening nut assembly comprising: positioning a plurality of threaded axial nut sections in an interior of a cap, pairing a spring to the threaded nut sections, joining the spring with a main body, and configuring the threaded nut sections to be engageable with a correspondingly threaded fastener.

The present disclosure can further provide a clamp-action fastening nut assembly comprising: a main body, a cap coupled to the main body, a collar in an interior of the cap, a plurality of threaded axial nut sections, a washer, and a spring, the spring being coupled to the main body and configured to biased the threaded nut sections towards a proximal end of the cap, wherein the washer is disposed between the threaded nut sections and the spring, wherein the collar is configured to guide movement of the threaded nut sections in a radial direction.

The present disclosure can also provide for a clamp-action fastening nut assembly, comprising a plurality of threaded axial nut sections arranged around an axial center of the fastening nut assembly, such as, for example, four threaded nut sections arranged concentrically around the axial center of the fastening nut assembly.

Although embodiments of a clamp-action fastening nut assembly, its components, and related methods have been specifically described and illustrated herein, many modifications and variations will be apparent to those skilled in the art. Furthermore, it is understood and contemplated that features specifically discussed for one clamp-action fastening nut assembly embodiment may be adopted for inclusion with another clamp-action fastening nut assembly embodiment, provided the functions are compatible. Accordingly, it is to be understood that the clamp-action fastening nut assembly, its components, and related methods constructed according to principles of the disclosed devices and methods may be embodied other than as specifically described herein. The disclosure is also defined in the following claims.

What is claimed is:

1. A clamp-action ratchet fastening nut assembly comprising:
   a body having a proximal end and a distal end;
   a hollow cap connected to the body;
   an annular collar within the hollow cap and defining an interior camming surface;
   a plurality of threaded axial nut sections disposed in the hollow cap in engagement with the annular collar, and configured for movement between a radially closed position in which the plurality of threaded axial nut sections form an axial bore having a continuous internal thread, and a radially open position; and
   a spring positioned in the hollow cap and configured to bias the plurality of threaded axial nut sections proximally against the interior camming surface of the annular collar, whereby the plurality of threaded axial nut sections is urged from the radially open position to the radially closed position.

2. The clamp-action ratchet fastening nut assembly of claim 1, wherein the plurality of threaded axial nut sections is configured to be moved from the radially closed position to the radially open position upon insertion of a threaded fastener into the axial bore.

3. The clamp-action ratchet fastening nut assembly according to claim 2, wherein the spring is a compression spring.

4. The clamp-action ratchet fastening nut assembly according to claim 2, wherein the plurality of threaded axial nut sections is configured to move distally and radially outward relative to the threaded fastener to the radially open position, such that the threaded fastener is insertable into the axial bore without rotation relative to the body.

5. The clamp-action ratchet fastening nut assembly according to claim 2, wherein the body comprises a through hole aligned with the axial bore.

6. The clamp-action ratchet fastening nut assembly according to claim 2, further comprising:
   a retaining ring retaining the plurality of threaded axial nut sections from moving beyond a defined path.

7. The clamp-action ratchet fastening nut assembly according to claim 2, wherein the annular collar is integrally formed with the hollow cap.

8. The clamp-action ratchet fastening nut assembly according to claim 7, further comprising a washer disposed between the spring and the plurality of threaded axial nut sections.

9. A method of assembling a clamp-action ratchet fastening nut assembly comprising:
   placing a plurality of threaded axial nut sections proximally of a body, the body having a proximal end and a distal end;
   connecting a hollow cap to the body;
   retaining an annular collar within the hollow cap, the annular collar defining an interior camming surface, and the plurality of threaded axial nut sections disposed in the hollow cap in engagement with the annular collar, the plurality of threaded axial nut sections being configured for movement between a radially closed position in which the plurality of threaded axial nut sections form an axial bore having a continuous internal thread, and a radially open position; and
   positioning a spring to compress between the threaded nut section and the body, the spring being configured to bias the plurality of threaded axial nut sections proximally against the interior camming surface of the annular collar, whereby the plurality of threaded axial nut sections is urged from the radially open position to the radially closed position.

10. The method according to claim 9, wherein the plurality of threaded axial nut sections is configured to be moved from the radially closed position to the radially open position upon insertion of a threaded fastener into the axial bore.

11. The method according to claim 10, wherein, when biasing the plurality of threaded axial nut sections, the plurality of threaded axial nut sections is biased radially outward relative to the threaded fastener to the radially open position, such that the threaded fastener is insertable into the axial bore without rotation relative to the body.

12. The method according to claim 10, wherein the body comprises a through hole aligned with the axial bore.

13. The method according to claim 9, wherein biasing the plurality of threaded axial nut sections towards the radially open position compresses the spring.

14. The method according to claim 9, further comprising:
   arranging a retaining ring to retain the plurality of threaded axial nut sections, such that the plurality of threaded axial nut sections is retained from moving beyond a defined path.

15. The method according to claim 9, wherein the annular collar is integrally formed with the hollow cap.

16. The method according to claim 15, wherein the body is inset inside the hollow cap.

17. A clamp-action ratchet fastening nut assembly comprising:
   a body defining a bore having a bore axis;
   a plurality of threaded nut sections, the plurality of threaded nut sections defining a bore having a bore axis aligned with the bore axis of the body; and
   a biasing member, the biasing member being paired to the body;
   wherein the plurality of threaded nut sections have an open position wherein the plurality of threaded nut sections are circumferentially spaced from each other and a closed position wherein the plurality of threaded nut sections contact each other to form a continuous thread.

18. The clamp-action ratchet fastening nut assembly according to claim 17, wherein the plurality of threaded nut sections in the open position is closer to a distal end of the ratchet fastening nut assembly than the plurality of threaded nut sections in the closed position.

* * * * *